United States Patent [19]
Reto et al.

[11] Patent Number: 5,825,857
[45] Date of Patent: Oct. 20, 1998

[54] METHOD AND SYSTEM FOR CALLING CARD VALIDATION HUBBING

[75] Inventors: Luis Reto; Don Turner, both of Plano, Tex.; Timothy Darland, Cedar Rapids, Iowa; Anis Khalil, Plano, Tex.; Cory Lenger, East Moline, Ill.; Amyn Merchant, Plano, Tex.

[73] Assignee: MCI Communications Corporation, Washington, D.C.

[21] Appl. No.: 527,560

[22] Filed: Sep. 13, 1995

[51] Int. Cl.⁶ .................................................. H04M 15/00
[52] U.S. Cl. ........................... 379/114; 379/112; 379/115; 379/144; 379/229; 379/91.01
[58] Field of Search ....................... 379/111–115, 90–92, 379/91.01, 91.02, 93.09, 93.11, 93.15, 100.13, 121, 126, 143, 144, 145, 154, 191, 196, 219, 222, 229, 242, 244; 370/465, 466, 468

[56] References Cited

U.S. PATENT DOCUMENTS

| | | | |
|---|---|---|---|
| 5,136,086 | 8/1992 | Ahearn et al. | 379/91 |
| 5,181,238 | 1/1993 | Medamana et al. | 379/95 |
| 5,185,781 | 2/1993 | Dowden et al. | 379/67 |
| 5,222,125 | 6/1993 | Creswell et al. | 379/67 |
| 5,282,244 | 1/1994 | Fuller et al. | 379/230 |
| 5,313,463 | 5/1994 | Gore et al. | 370/110.1 |
| 5,377,186 | 12/1994 | Wegner et al. | 370/62 |
| 5,434,852 | 7/1995 | La Porta et al. | 379/165 |
| 5,487,107 | 1/1996 | Atkins et al. | 379/144 |
| 5,513,250 | 4/1996 | McAllister | 379/91 |
| 5,517,562 | 5/1996 | McConnell | 379/207 |
| 5,586,175 | 12/1996 | Hogan et al. | 379/112 |
| 5,640,446 | 6/1997 | Everett et al. | 379/115 |

Primary Examiner—Curtis A. Kuntz
Assistant Examiner—Binh K. Tieu

[57] ABSTRACT

Method and system for calling card validation hubbing provides a hubbed architecture for communicating validation messages relating to a calling card number to be validated between a telecommunications network which accepts a calling card call and the telecommunications network which issued the card. The hubbing system provides transport links and protocol translation between ANSI SS7, ITU CCS7 and X.25 for each telecommunications network which is attached. When an attached telecommunications network accepts a calling card call, an authorization request including calling card number is sent to the hubbing system, translated to the protocol used by the card issuing network and transported to the card issuing network for validation. Also communicated are request responses, which indicate success or failure of validation, and call disposition messages, which provide a timely estimate of call duration and charges.

25 Claims, 26 Drawing Sheets

Performed on CAN Gateway

Performed on Validation Hubbing Server

Performed on CIN Gateway

Performed on CIN Gateway

Performed on Validation Hubbing Server

Performed on CAN Gateway

Performed on CAN Gateway

Performed on Validation Hubbing Server

Performed on CIN Gateway

FIG. 11a

1100 Authorization Request

| 1101 Message Type Identifier | 1102 Message Reference Identifier | 1103 Primary Account Number | 1104 Card Acceptor Identifier | 1105 Additional Information |
|---|---|---|---|---|

FIG. 11b

1120 Request Response

| 1121 Message Type Identifier | 1122 Message Reference ID | 1123 Primary Account Number | 1124 Response Code | 1125 CDM Request | 1126 Other Data |
|---|---|---|---|---|---|

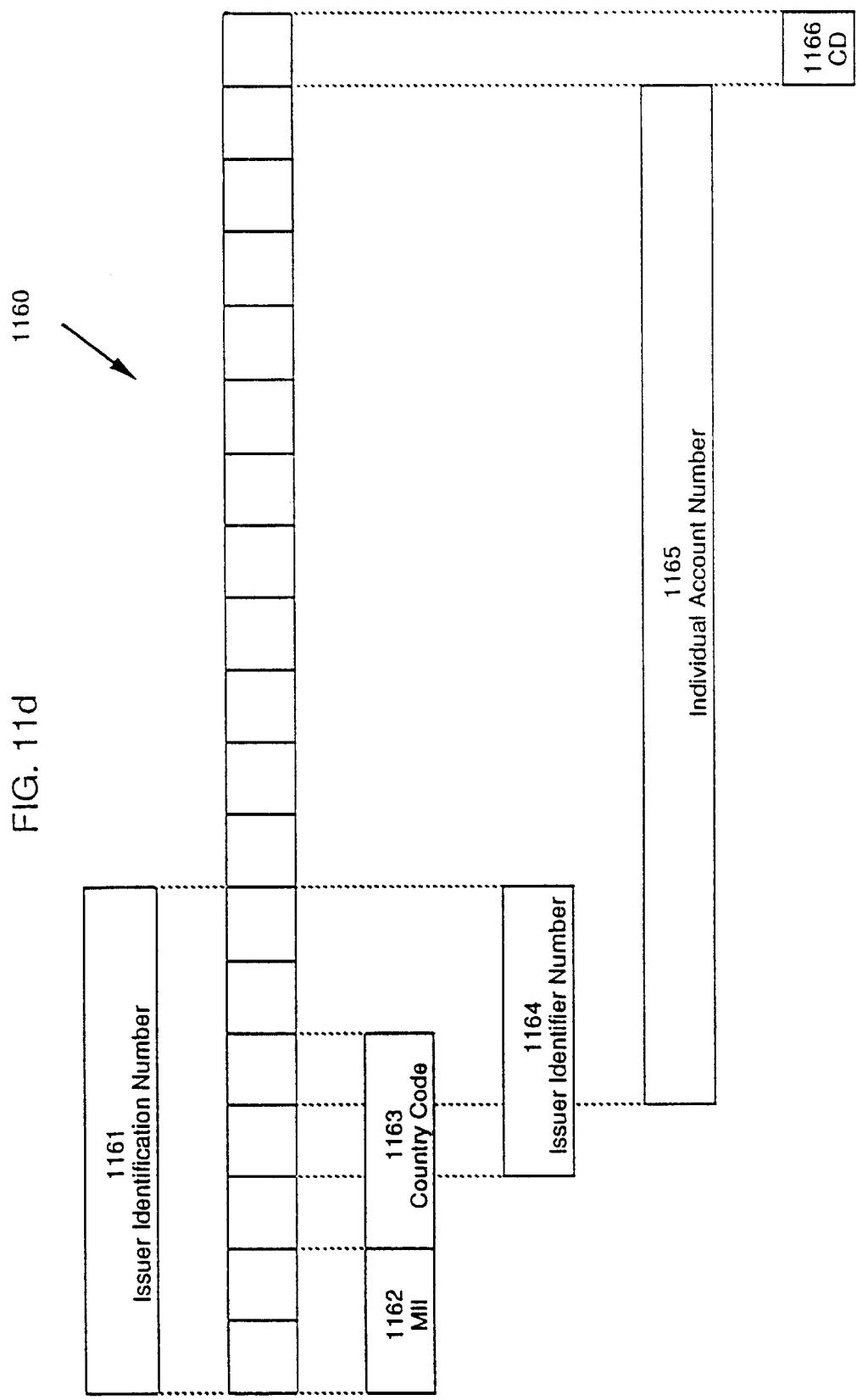

METHOD AND SYSTEM FOR CALLING CARD VALIDATION HUBBING

BACKGROUND OF THE INVENTION

1. Field Of The Invention

The invention relates generally to automated validation of calling card calls, and more particularly to centralized hubbing of physical connections to telecommunications networks and protocol translation of automated validation messages.

2. Definitions

The following terms are used as follows:

Administration—A telecommunications service provider.

Network—The telecommunications network operated by a single administration.

Card (ITCC)—An International Telecommunications Charge Card.

Originating Network—The network of the calling party which is the network from which an ITCC service request originates.

Terminating Network—The network of the called party.

Card Acceptor—The administration that accepts the use of the card as payment for the provision of certain telecommunications services.

Card Acceptor Network (CAN)—The telecommunications network operated by the card acceptor.

Card Issuer—The administration that issues the card. The card issuer is responsible for the collection of charges from the card holder and for making the appropriate payments for the service concerned to the card acceptor.

Card Issuer Network (CIN)—The telecommunications network operated by the card issuer.

Authorization request—A message from the card acceptor to the card issuer requesting validation of a card number and authorization of the use of the card.

Request response—A message from the card issuer to the card acceptor in response to an authorization request.

Call Disposition Message (CDM)—A message from the card acceptor to the card issuer which provides a timely estimate of call duration and charges.

The information disclosed in this document is in accordance with CCITT Recommendations E.113, E.116 and E.118.

BACKGROUND INFORMATION

Calling cards allow telephone calls to be billed to accounts which may be unrelated to home or business telephone accounts. Before a card call is connected, the card number must be validated in order to ensure proper billing and prevent fraud. When card calls are placed within the card issuer network (CIN), the card issuer has control over the validation process. When calls are placed through other networks, validation is more difficult. In general, a card acceptor network (CAN) cannot itself validate a card issued by a CIN. Validation must be performed by the CIN. For example:

1) Card call back to the CIN—a call originated within the CAN destined for the CIN.

2) Card call within the CAN—a call originated within the CAN destined for the CAN.

3) Card call between the CAN and a third network—a call originated within the CAN destined for a terminating network which is not the CIN or the CAN.

Therefore, the card number must be communicated from the CAN to the CIN for validation and the results of the validation process must be communicated back from the CIN to the CAN.

There are two problems which must be resolved in order to achieve the inter-network communications necessary to implement this communication procedure:

1) There must be validation transport links between each CIN and each CAN for which validation is to be available. This means that a physical signal connection must be made between each CIN and each CAN. As some countries have more than one network, a physical signal connection must be made not just to each country, but to each network. While some networks have put such links in place, the expense and technical difficulty has prevented many networks from doing so.

2) The validation protocols of various networks are incompatible. There are three protocols which are currently in use around the world. Some networks use ANSI SS7, some use ITU CCS7 and some use X.25. In order for validation messages to be successfully passed, there must be translation between these protocols and any others which may be used.

FIG. 1 is a block diagram of an example of the prior art world-wide validation architecture 100. As an example, eight telecommunications networks 102, 104, 106, 108, 110, 112, 114 and 116 are shown. Network 102 has validation transport links 120, 122, 124, 126, 128, 130 and 132 with each other network respectively. Therefore, calling card validation may be possible with each other network. Network 104 has validation transport links with networks 102, 108, 112 and 114. Therefore, network 104 has the possibility of calling card validation services only with networks 102, 108, 112 and 114. Networks 106, 110 and 116 have validation transport links only with network 102. Therefore, these networks have the possibility of calling card validation services only with network 102. In order to have the capability for calling card validation, validation protocol compatibility or translation is required in addition to validation transport links.

FIG. 2 is a block diagram of an example of the prior art validation architecture from the point of view of a single network 202. Nine other networks 204, 206, 208, 210, 212, 214, 216, 218 and 220 are shown. The other networks are divided into three groups 230, 232 and 234. Group 230 includes networks 204, 206 and 208 and uses ANSI SS7 as its validation protocol. Group 232 includes networks 210, 212 and 214 and uses ITU CCS7 as its validation protocol. Group 234 includes networks 216, 218 and 220 and uses X.25 as its validation protocol. Network 202 is connected to networks 204 and 206 in Group 230 by validation transport links 222 and 224, respectively. Because network 202, network 204 and network 206 each use ANSI SS7 and because network 202 has transport links with network 204 and network 206, network 202 has the capability for validation services with network 204 and network 206. Network 202 does not have a transport link to network 208. Despite the compatibility in validation protocols between network 202 and network 208, the absence of a transport link prevents network 202 from having the capability for validation services with network 208. Network 202 also has validation transport link 228 connected to network 216 of Group 234. Despite this transport link, network 202 does not have the capability for validation services with network 216 because network 216 uses an incompatible validation protocol, X.25. Network 202 has no transport links with and uses an incompatible validation protocol from networks 210, 212, 214, 218 and 220. Network 202 has no capability for validation services with these networks.

Prior art validation architectures do not provide transport links and protocol translation in an orderly and consistent manner. As a result, validation services are not provided comprehensively and such service must be established between networks on an individual basis. A need exists for a validation architecture which provides comprehensive validation service and facilitates the addition of networks to the service.

SUMMARY OF THE INVENTION

The need for comprehensive service and facilitation of the addition of networks is met by the method and system for ITCC validation hubbing. In accordance with the invention, an ITCC validation hubbing system provides centralized protocol translation for all validation messages sent between any two networks and transport links between the network and the hubbing system. Centralized protocol translation provides comprehensive validation service because any connected network can validate messages with any other connected network, regardless of the protocols each uses. In order to provide validation service to an additional network, all that is needed is to establish a transport link between the additional network and the hubbing system. Often this transport link can be provided by a physical connection between the additional network and a network already connected to the hubbing system. This facilitates the addition of networks because the establishment of one physical connection provides validation service with all other connected networks.

When a call is placed in a CAN using a card issued by a CIN, the CAN sends to the hubbing system an authorization request destined for the CIN. At the hubbing system, the authorization request is reformatted and then screened to ensure that the origination point of the call is allowed. If the screening fails, the validation process is terminated and a rejection message is sent to the CAN. If the screening succeeds, the authorization request is reformatted to the format specified by the CIN, either ANSI SS7, ITU CCS7 or X.25. The authorization request is then sent to the CIN. The authorization request is in the format specified by the CIN, so the CIN performs its normal validation process on the request. The CIN then sends to the hubbing system a request response destined for the CAN. The request response indicates whether the validation failed or was successful. The request response also may optionally include a request for a call disposition message. At the hubbing system, the request response is reformatted to the format specified by the CAN and is sent to the CAN. The CAN connects the call if validation was successful and terminates the call if validation failed. If the request response includes a request for a call disposition message, the CAN will send to the hubbing system a call disposition message destined for the CIN. At the hubbing system, the call disposition message is reformatted and sent to the CIN.

DESCRIPTION OF THE FIGURES

FIG. 9b is a flow diagram of a subprocess of step 904 of FIG. 9a.

FIG. 9c is a flow diagram of a subprocess of step 905 of FIG. 9a.

FIG. 9d is a flow diagram of a subprocess of step 906 of FIG. 9a.

FIG. 9e is a flow diagram of a subprocess of step 910 of FIG. 9a.

FIG. 9f is a flow diagram of a subprocess of step 911 of FIG. 9a.

FIG. 9g is a flow diagram of a subprocess of step 912 of FIG. 9a.

FIG. 9h is a flow diagram of a subprocess of step 920 of FIG. 9a.

FIG. 9i is a flow diagram of a subprocess of step 921 of FIG. 9a.

FIG. 9j is a flow diagram of a subprocess of step 922 of FIG. 9a.

FIG. 11a is a format of an authorization request message 1100.

FIG. 11b is a format of a request response message 1120.

FIG. 11d is a format of an International Telecommunications Charge Card Personal Account Number 1160.

DETAILED DESCRIPTION OF THE INVENTION

Figure 1:
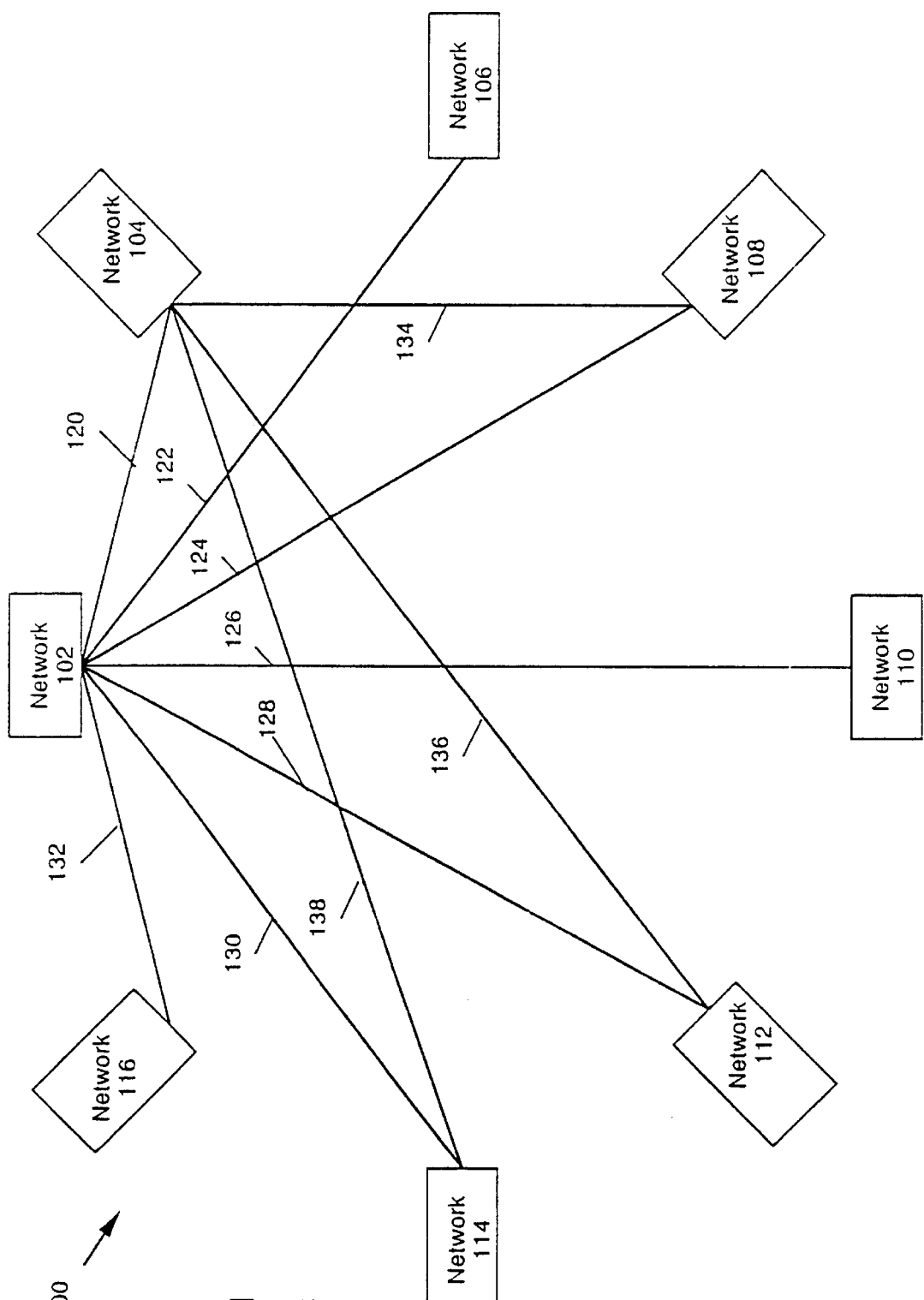
FIG. 1 is a block diagram of the prior art world-wide validation architecture.
Figure 2:
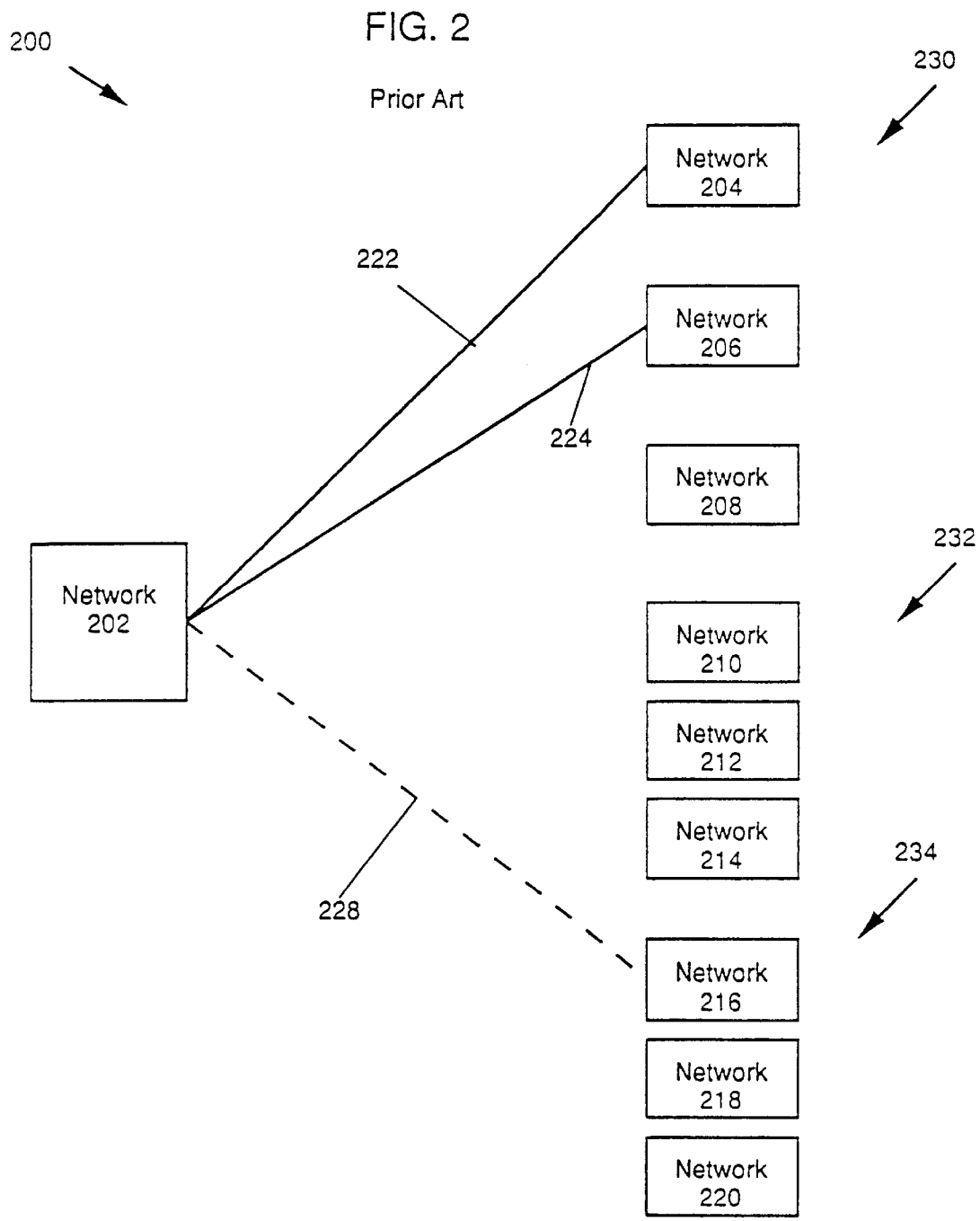
FIG. 2 is a block diagram of the prior art validation architecture for a single telecommunications network.
Figure 3:
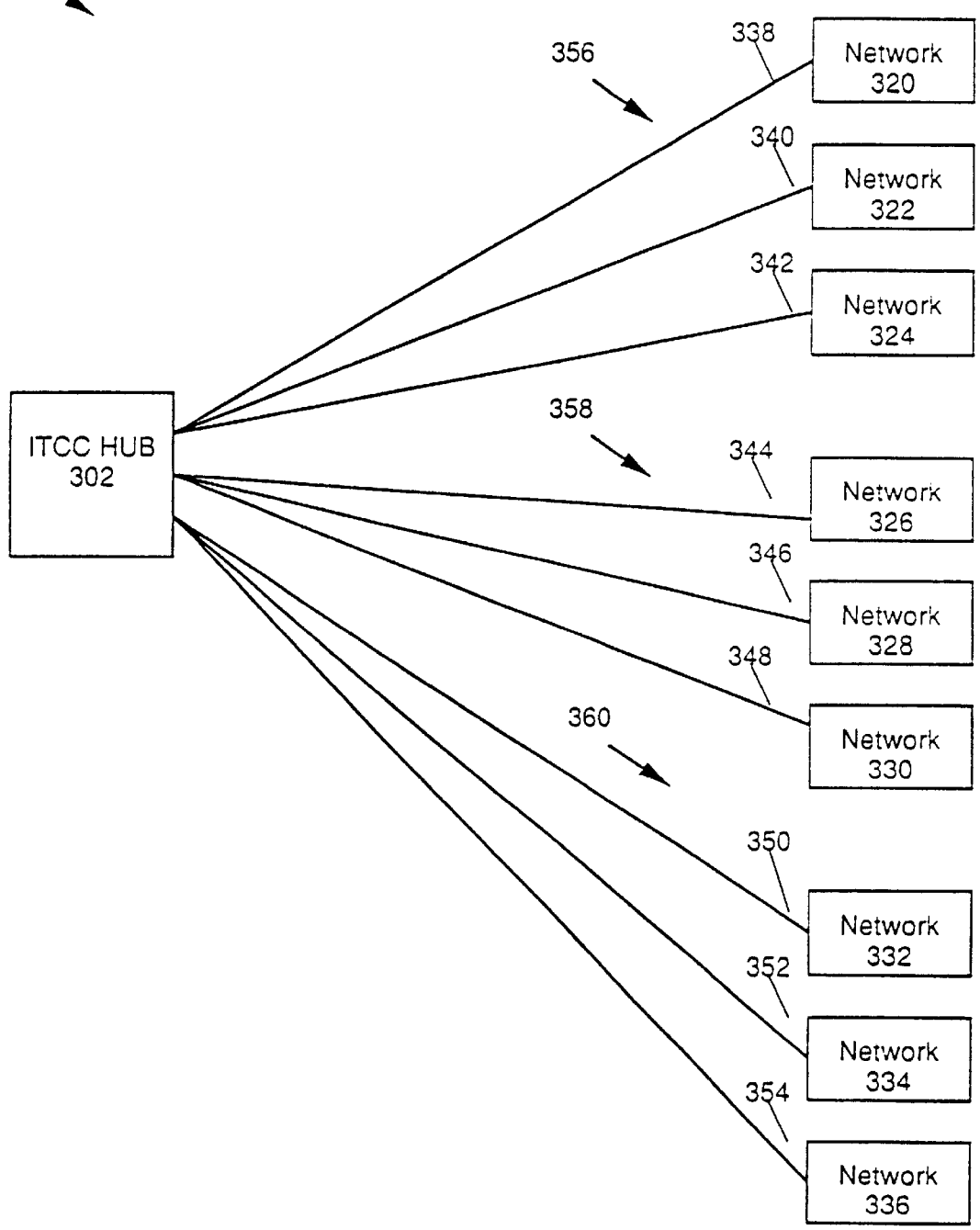
FIG. 3 is a block diagram of a world-wide validation architecture in accordance with the present invention.

FIG. 3 is a block diagram of calling card hubbing network architecture 300, in accordance with the present invention. FIG. 3 includes International Telecommunications Charge Card (ITCC) Validation Hubbing System 302. Networks 320, 322 and 324 are in Group 356 and use ANSI SS7 as their validation protocol. Networks 326, 328 and 330 are in Group 358 and use ITU CCS7 as their validation protocol. Networks 332, 334 and 336 are in Group 360 and use X.25 as their validation protocol. The networks are connected to ITCC Hub 302 by transport links 338, 340, 342, 344, 346, 348, 350, 352 and 354, respectively. In this architecture, all networks have the capability to be a CIN, a CAN or both. The particular networks which are the CIN and CAN for a particular transaction depend on the details of that transaction. Each network 320 to 336 is capable of sending and receiving validation messages using a particular protocol. At present, several protocols are in use. Examples of common protocols include ANSI SS7 TCAP, ITU CCS7 TCAP and X.25. The present invention is capable of communicating messages using these protocols, but the architecture allows additional protocols to be implemented.

Figure 4:
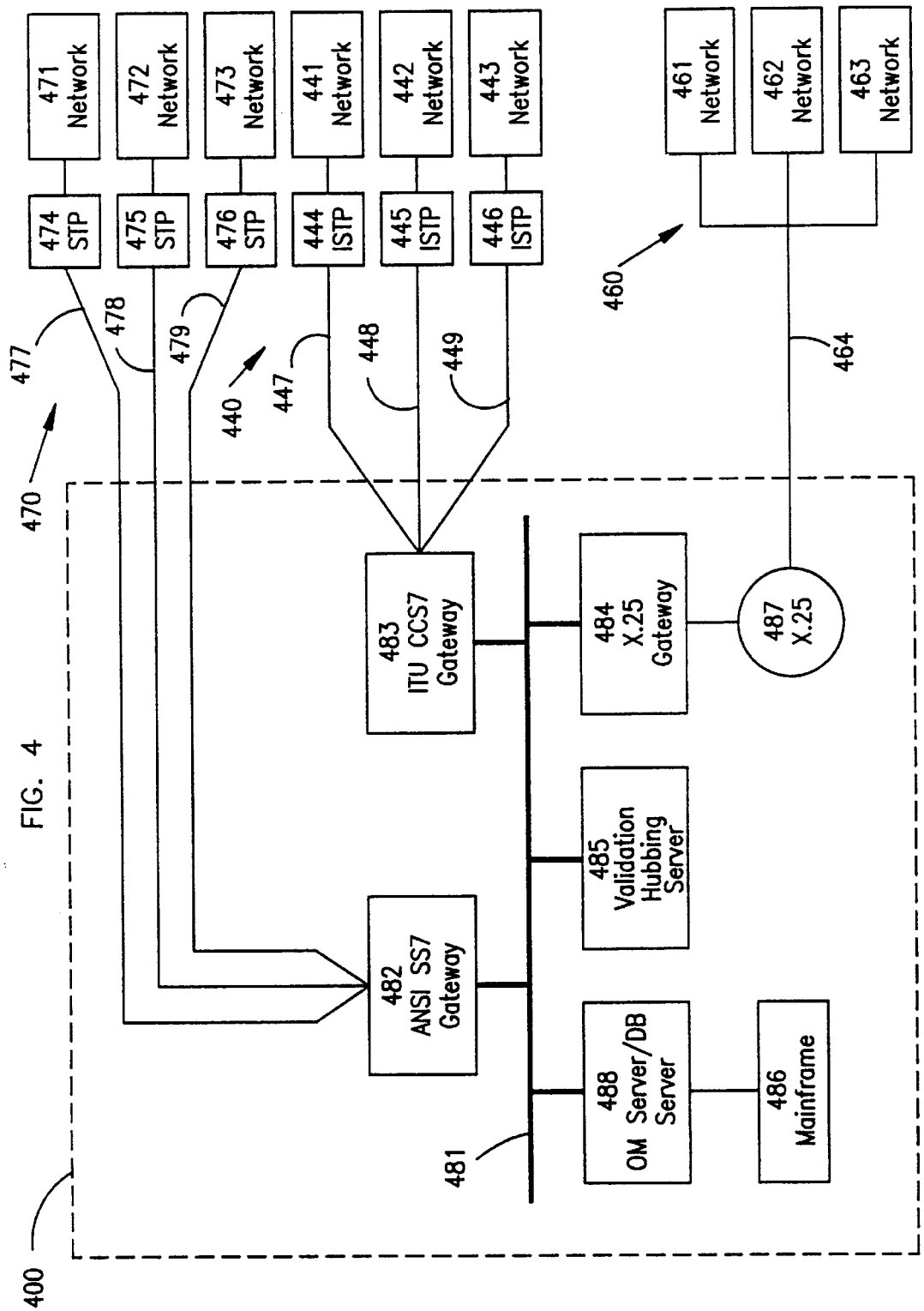
FIG. 4 is a block diagram of an international telecommunications charge card validation hubbing system, in accordance with the present invention.

FIG. 4 is a block diagram of an ITCC validation hubbing system 400, in accordance with the present invention. Hubbing system 400 is shown to be connected to three groups of telecommunications networks. Group 470 includes networks 471, 472 and 473 and uses ANSI SS7 as its validation protocol. Network 471 is connected to signal transfer point (STP) 474, network 472 is connected to STP 475 and network 473 is connected to STP 476. A signal transfer point (STP) is a packet switch which sends data messages between other network elements. STPs 474, 475 and 476 are connected to ANSI SS7 Gateway 482 through transport links 477, 478 and 479 respectively. Group 440 includes networks 441, 442 and 443 and uses ITU CCS7 as its validation protocol. Network 441 is connected to international signal transfer point (ISTP) 444, network 442 is connected to ISTP 445 and network 443 is connected to ISTP 446. ISTPs 444, 445 and 446 are connected to ITU CCS7 Gateway 483 through transport links 447, 448 and 449, respectively. Group 460 includes networks 461, 462 and 463 and uses X.25 as its validation protocol. Networks 461, 462 and 463 are connected through transport link 464 to X.25 network 487 which is connected to X.25 Gateway 484. ANSI SS7 Gateway 482, ITU CCS7 Gateway 483 and X.25 Gateway 484 are connected together by local area network (LAN) 481. LAN 481 is a standard local area network such as Ethernet or Token Ring. Each Gateway 482, 483, and 484 includes several capabilities. Each Gateway can distinguish between authorization requests originated by or destined for the hubbing system. Each can route authorization requests, request responses, or call disposition messages (CDMs) among networks. Each Gateway can maintain operational measurements (OMs) to monitor authorization request processing.

Also connected by network 481 is validation hubbing server 485 and OM Server/DB Server 488 which connects to mainframe computer 486. Validation hubbing server 485 performs several functions, including determining whether each authorization request is destined for a remote CIN or whether it is to be validated locally. OM Server/DB Server 488 collects OMs and billing information from ITU CCS7 Gateway 483, ANSI SS7 Gateway 482 and X.25 Gateway 484. Each Gateway ships its OMs to OM Server/DB Server 488 at configurable regular intervals. OM Server/DB Server 488 collects the OMs and forwards them to mainframe computer 486 for storage and processing.

Figure 5:
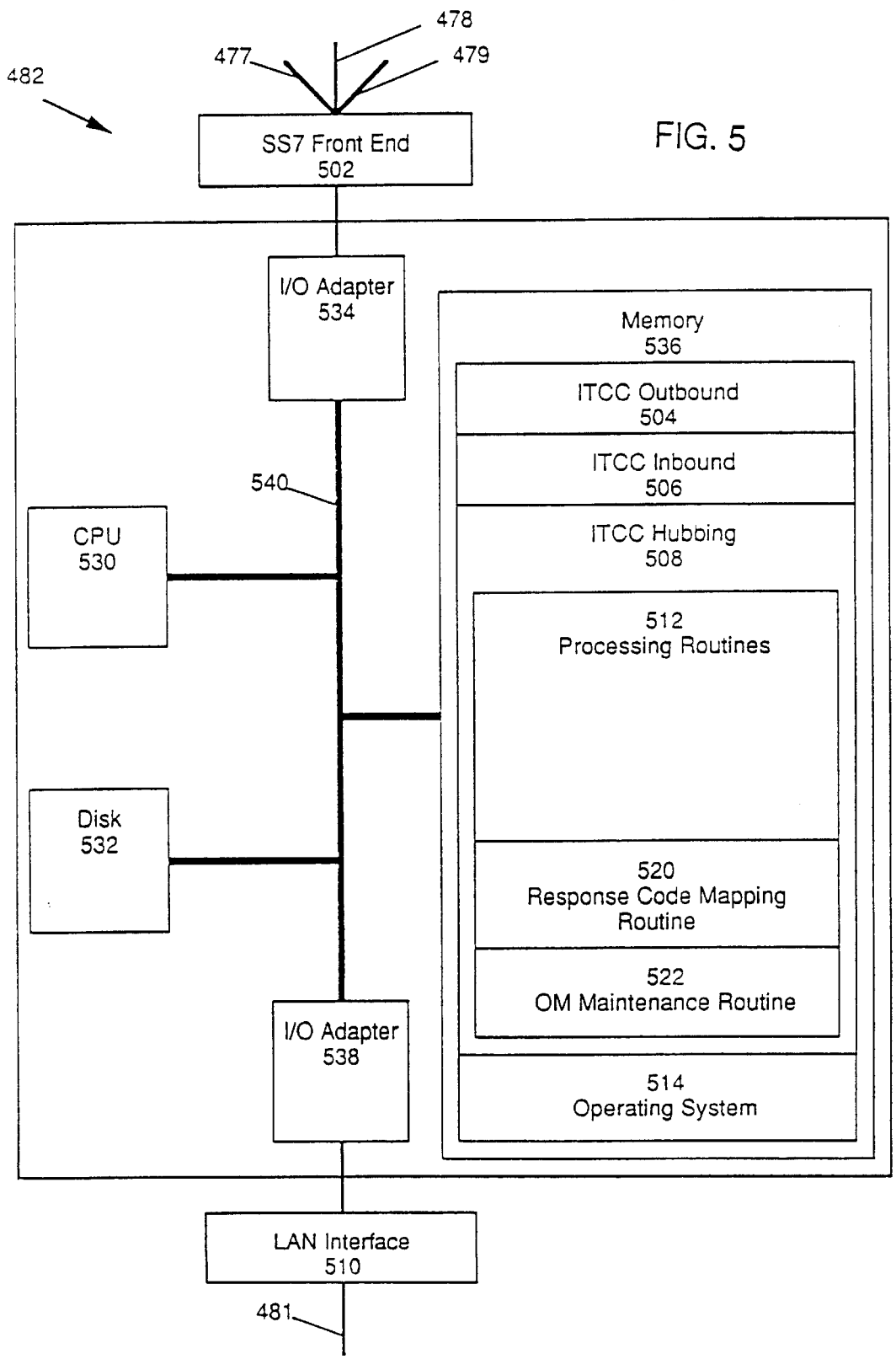
FIG. 5 is a block diagram of an ANSI SS7 Gateway shown in FIG. 4.

FIG. 5 is a block diagram of an ANSI SS7 Gateway 482 shown in FIG. 4. Gateway 482 includes several elements. CPU 530 executes program instructions and processes data. Disk 532 stores data to be transferred to and from memory. I/O Adapters 534 and 538 communicate with other devices and transfer data in and out of Gateway 482. Memory 536 stores program instructions executed by and data processed by CPU 530. All these elements are interconnected by bus 540, which allows data to be intercommunicated between the elements. Gateway 482 also includes LAN Interface 510 connected to I/O Adapter 538 and LAN 481 and also includes SS7 front end 502 connected to I/O Adapter 534 and transport links 477, 478 and 479.

Memory 536 is accessible by CPU 530 over bus 540 and contains operating system 514 and three subsystems 504, 506 and 508. ITCC inbound subsystem 506 processes validation messages sent from other networks to the hubbing system operator's network. ITCC outbound subsystem 504 processes validation messages sent from the hubbing system operator's network to other networks. TTCC hubbing subsystem 508 handles the processing of validation messages sent between other networks. The processing of subsystem 508 is shown in detail in FIG. 9a and 10 below.

Messages received from networks over transport links 477, 478 and 479 by Gateway 482 are in ANSI SS7 TCAP format. The card issuer identification number to validation path mapping is provided by analyzing the card issuer identification number embedded in the card number. The issuer identification number indicates to Gateway 482 whether the request should be handled by Hubbing subsystem 508 or by subsystems 504 or 506. Hubbing subsystem 508 includes processing routines 512 which implement the ANSI SS7 Gateway portions of process 900 of FIG. 9a below. Subsystem 508 includes response code mapping routine 520 which maps message formats between X.25, ANSI SS7 and ITU CCS7. Hubbing subsystem 508 also includes OM Maintenance Routine 522 which maintains operational measurements (OMs) for validation messages processed by Gateway 482. Routine 522 ships the set of OMs to OM Server/DB Server 488 on a regular basis.

Figure 6:
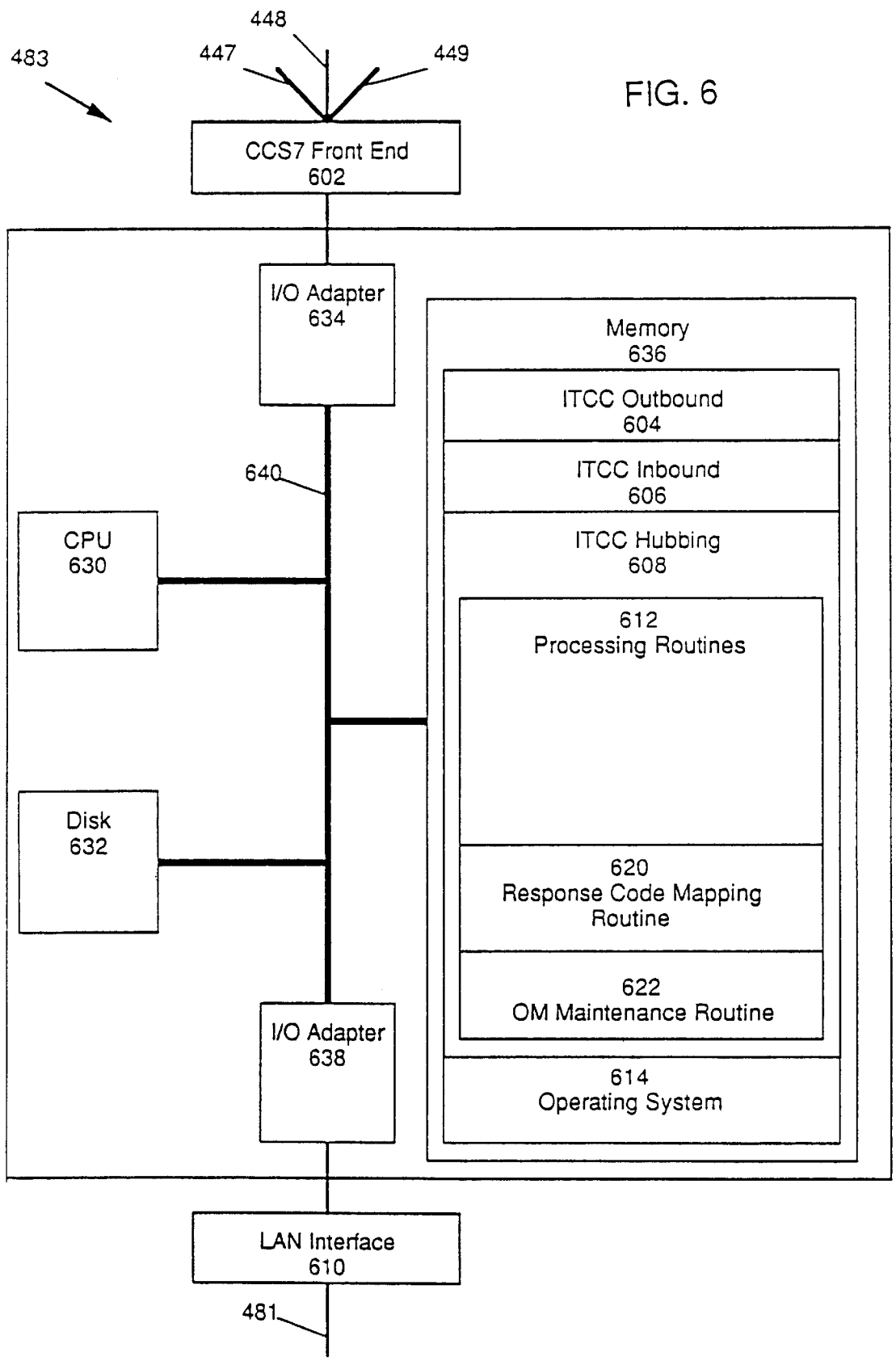
FIG. 6 is a block diagram of an ITU CCS7 Gateway shown in FIG. 4.

FIG. 6 is a block diagram of an ITU CCS7 Gateway 483 shown in FIG. 4. Gateway 483 includes several elements. CPU 630 executes program instructions and processes data. Disk 632 stores data to be transferred to and from memory. I/O Adapters 634 and 638 communicate with other devices and transfer data in and out of Gateway 483. Memory 636 stores program instructions executed by and data processed by CPU 630. All these elements are interconnected by bus 640, which allows data to be intercommunicated between the elements. Gateway 483 also includes LAN Interface 610 connected to I/O Adapter 638 and LAN 481 and also includes SS7 front end 602 connected to I/O Adapter 634 and transport links 447, 448 and 449.

Memory 636 is accessible by CPU 630 over bus 640 and contains operating system 614 and three subsystems 604, 606 and 608. ITCC inbound subsystem 606 processes validation messages sent from other networks to the hubbing system operator's network. ITCC outbound subsystem 604 processes validation messages sent from the hubbing system operator's network to other networks. ITCC hubbing subsystem 608 handles the processing of validation messages sent between other networks. The processing of subsystem 608 is shown in detail in FIG. 9a and 10 below.

Messages received from networks over transport links 447, 448 and 449 are in ITU CCS7 TCAP format. The card issuer identification number to validation path mapping is provided by analyzing the card issuer identification number embedded in the card number. The issuer identification number indicates to Gateway 483 whether the request should be handled by hubbing subsystem 608 or by subsystems 604 or 606. Hubbing subsystem 608 includes processing routines 612 which implement the ITU CCS7 Gateway portion of process 900 of FIG. 9a below. Subsystem 608 includes response code mapping routine 620 which is required for mapping message formats between X.25, ANSI SS7 and ITU CCS7. Hubbing subsystem 608 also includes OM Maintenance Routine 622 which maintains operational measurements (OMs) for validation messages processed by Gateway 483. Routine 622 ships the set of OMs to OM Server/DB Server 488 on a regular basis.

Figure 7:
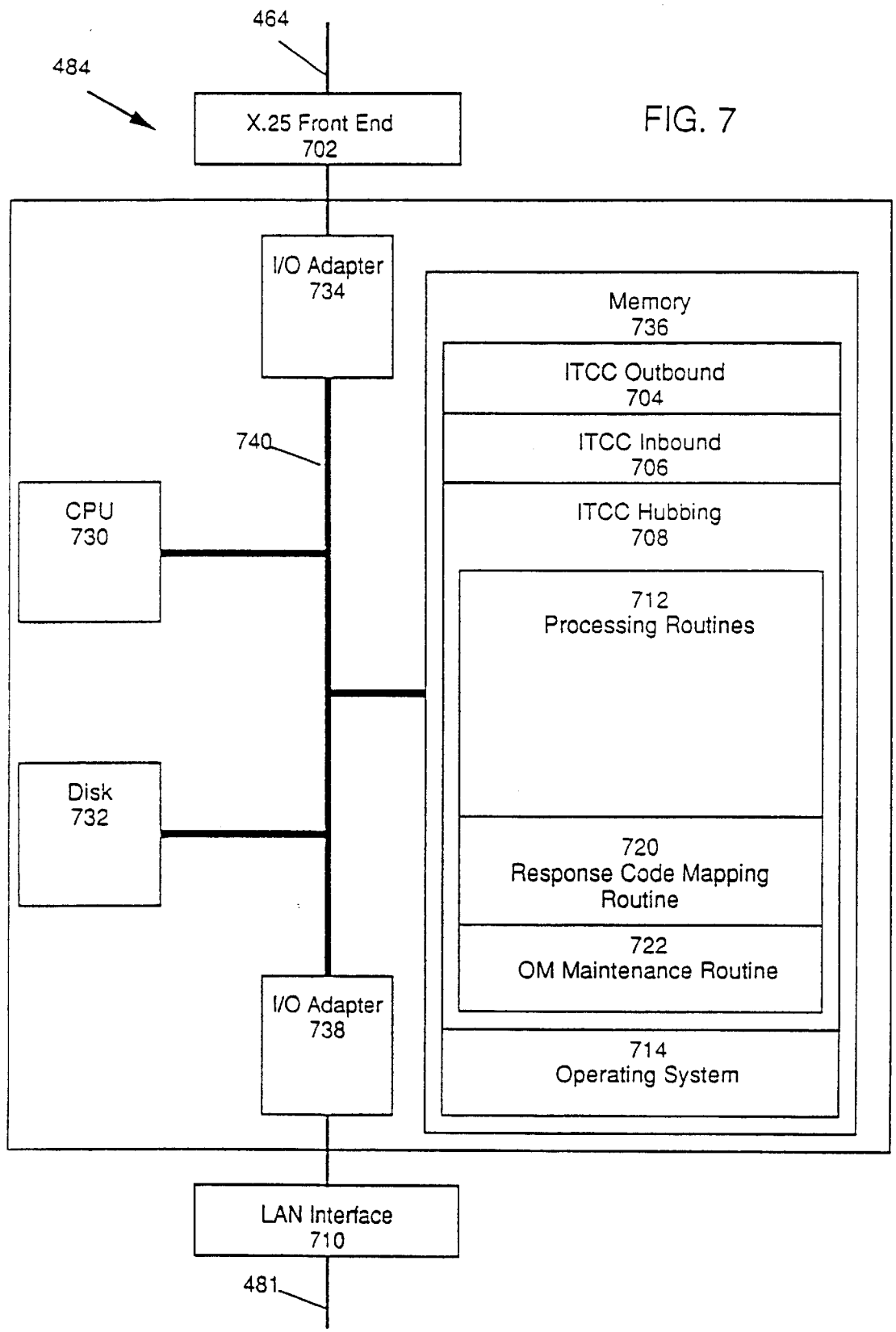
FIG. 7 is a block diagram of a X.25 Gateway shown in FIG. 4.

FIG. 7 is a block diagram of a X.25 Gateway 484 shown in FIG. 4. Gateway 484 includes several elements. CPU 730 executes program instructions and processes data. Disk 732 stores data to be transferred to and from memory. I/O Adapters 734 and 738 communicate with other devices and transfer data in and out of Gateway 484. Memory 736 stores program instructions executed by and data processed by CPU 730. All these elements are interconnected by bus 740, which allows data to be intercommunicated between the elements. Gateway 484 also includes LAN Interface 710 connected to I/O Adapter 738 and LAN 481 and also includes SS7 front end 702 connected to I/O Adapter 734 and transport link 464.

Memory 736 is accessible by CPU 730 over bus 740 and contains operating system 714 and three subsystems 704, 706 and 708. ITCC inbound subsystem 706 processes validation messages sent from other networks to the hubbing system operator's network. ITCC outbound subsystem 704 processes validation messages sent from the hubbing system operator's network to other networks. ITCC hubbing subsystem 708 handles the processing of validation messages sent between other networks. The processing of subsystem 708 is shown in detail in FIG. 9a and 10 below.

Messages received from networks over transport link 464 are in X.25 format. The card issuer identification number to validation path mapping is provided by analyzing the card issuer identification number embedded in the card number. The issuer identification number indicates to Gateway 484 whether the request should be handled by hubbing subsystem 708 or by subsystems 704 or 706. Hubbing subsystem 708 includes processing routines 712 which implement the X.25 Gateway portion of process 900 of FIG. 9a below. Subsystem 708 includes response code mapping routine 720 which is required for mapping message formats between X.25, ANSI SS7 and ITU CCS7. Hubbing subsystem 708 also includes OM Maintenance Routine 722 which maintains operational measurements (OMs) for validation messages processed by Gateway 483. Routine 722 ships the set of OMs to OM Server/DB Server 488 on a regular basis.

Figure 8:
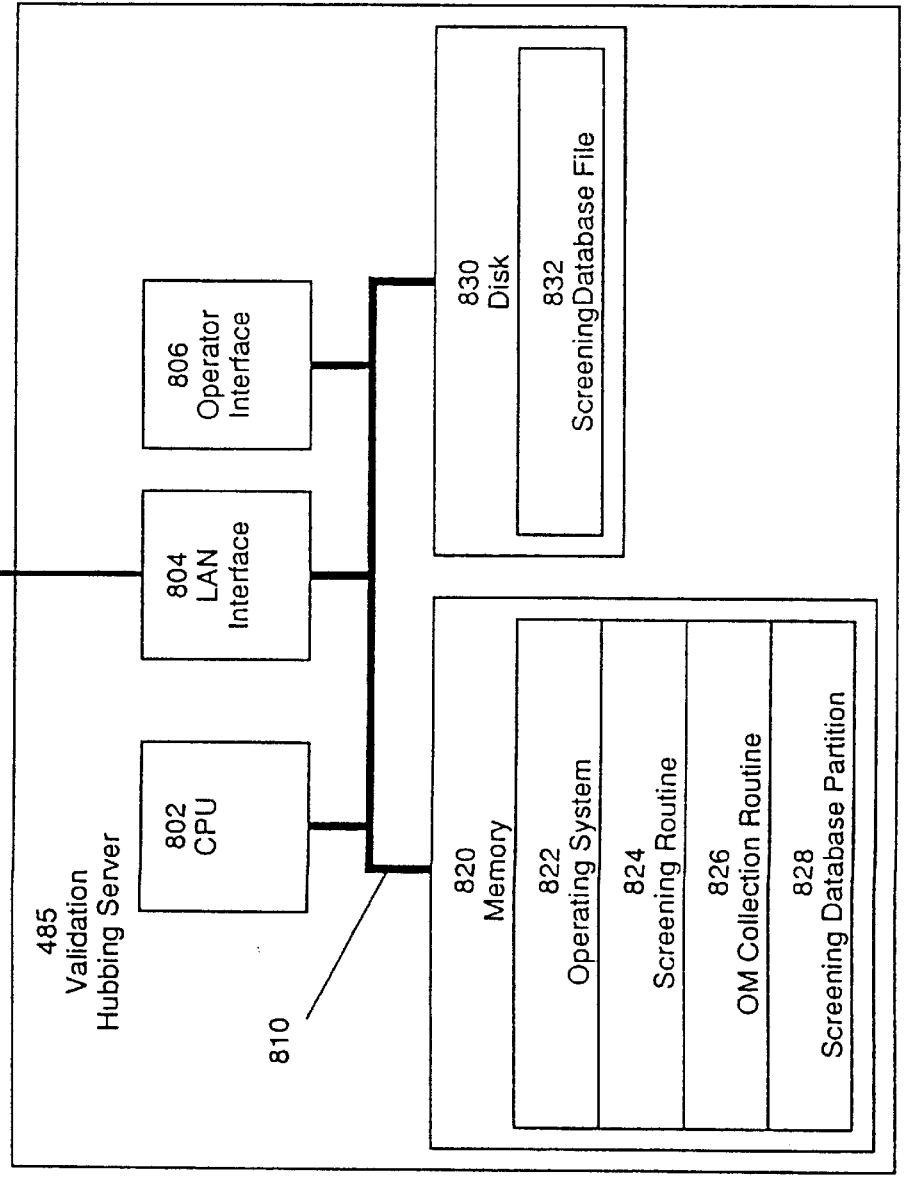
FIG. 8 is a block diagram of a validation hubbing server shown in FIG. 4.

FIG. 8 is a block diagram of a validation hubbing server 485 shown in FIG. 4. Validation hubbing server 485 includes several elements. CPU 802 executes program instructions and processes data. Disk 830 stores data to be transferred to and from memory. LAN interface 804 communicates with other devices and transfers data in and out of validation hubbing server 485 over local or wide area networks, such as, for example, Ethernet or Token Ring. Memory 820 stores program instructions executed by and data processed by CPU 802. Validation hubbing server 485 also may include an operator interface 806, for providing status information to and accepting commands from a system operator. All these elements are interconnected by bus 810, which allows data to be intercommunicated between the elements.

Memory 820 is accessible by CPU 802 over bus 810 and contains operating system 822, screening routine 824, OM collection routine 826, and screening database partition 828. Disk 830 includes screening database file 832.

Validation hubbing server 485 provides point of origin code screening for authorization requests originated by other networks. Authorization requests are forwarded for screening from ITU CCS7 Gateway 483, ANSI SS7 Gateway 482 and X.25 Gateway 484. Screening database 828 and 832 contains tables populated with allowable point of origin codes. Screening routine 824 compares the point of origin code of each authorization request with the allowable codes contained in the database. If all checks are successful, a success message is returned to the forwarding Gateway. If even one check fails, a reject message is issued.

Figure 9A:
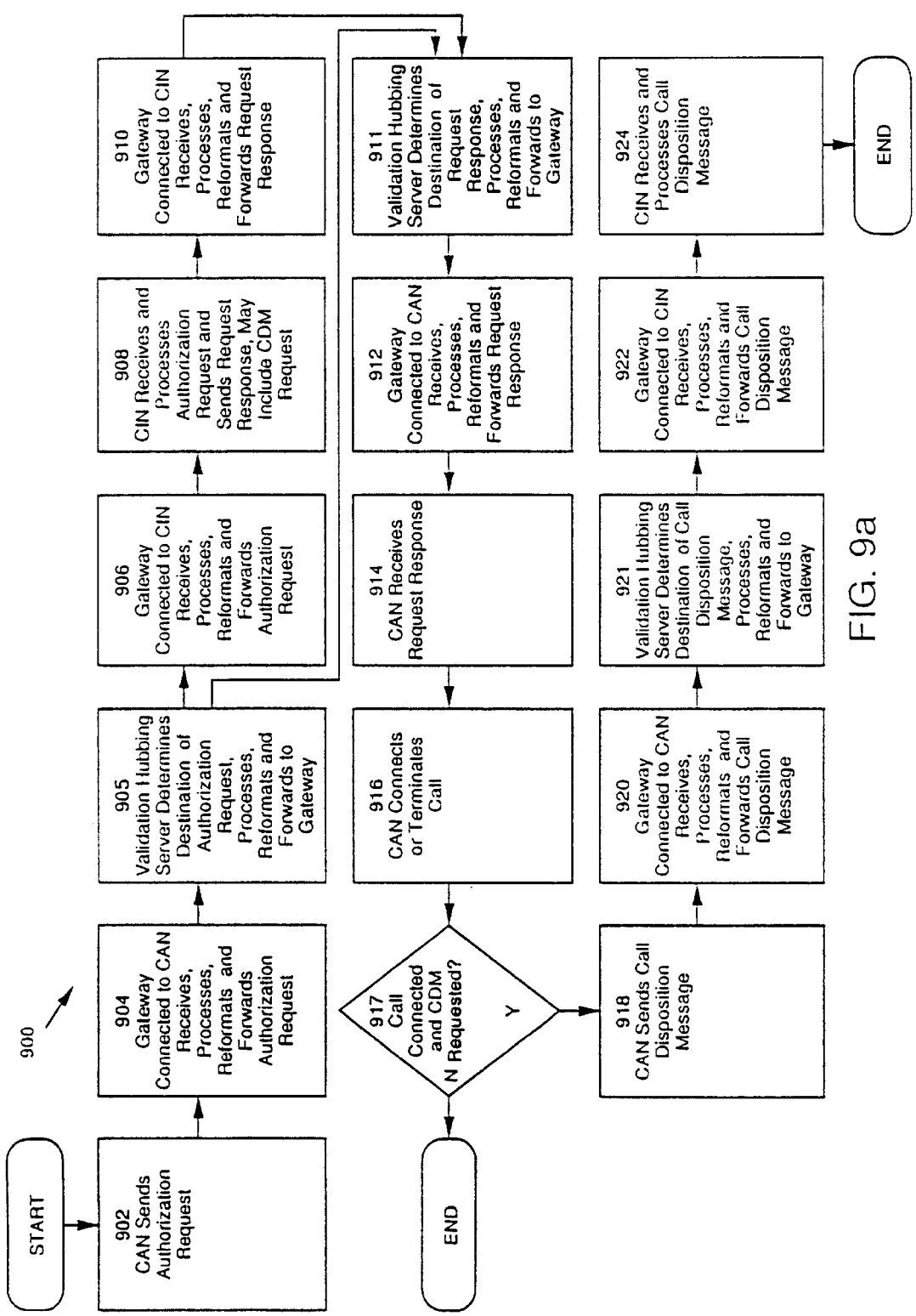
FIG. 9a is a flow diagram of process 900 which handles validation messages sent between other networks.

FIG. 9a is a flow diagram of a process 900 which handles validation messages. The process begins with step 902, in which a CAN sends an authorization request. In step 904, the gateway connected to the CAN receives, processes, reformats and forwards the authorization request to validation hubbing server 485. In step 905, validation hubbing server 485 receives the authorization request and determines its destination. If the destination is local, validation hubbing server 485 validates the authorization request locally and generates a request response. The process then continues with step 911. If the destination is a remote CIN, validation hubbing server 485 processes, reformats and forwards the authorization request to the gateway connected to the CIN. This may be the same gateway to which the CAN is connected, or it may be a different gateway. The authorization request is reformatted and forwarded to the appropriate gateway depending on the destination CIN of the request. In step 906, the gateway connected to the CIN receives, processes, reformats and forwards the authorization request to the CIN.

In step 908, the CIN receives and processes the authorization request and sends a request response indicating the success or failure of the validation. The request response may also include an optional request for a CDM from the CAN. In step 910, the gateway connected to the CIN receives, processes and forwards the request response to validation hubbing server 485. In step 911, validation hubbing server 485 receives the request response from the CIN or alternatively from the local validation process, determines its destination, processes, reformats and forwards it to the gateway connected to the CAN. In step 912, the gateway connected to the CAN receives, processes, reformats and forwards the request response to the CAN.

In step 914 the CAN receives the request response. In step 916, the CAN connects the call if the request response indicates validation was successful and terminates the call if the request response indicates validation was not successful. In step 917, the CAN determines whether the call was completed or a call attempt made and whether the request response included a request for a CDM. If either the call was not completed or no call attempt was made or if the request response did not include a request for a CDM, the process ends. If either the call was completed or a call attempt was made and if the request response included a request for a CDM, the process continues with step 918, in which the CAN sends a CDM which provides a timely estimate of call duration and charges. In step 920, the gateway connected to the CAN receives, processes, reformats and forwards the CDM to validation hubbing server 485. In step 921, validation hubbing server 485 receives the CDM, determines its destination, processes, reformats and forwards it to the gateway connected to the CIN. In step 922, the gateway connected to the CIN receives, processes, reformats and forwards the CDM to the CIN. In step 924, the CIN receives the CDM from the validation hubbing system, then processes it.

Figure 9B:
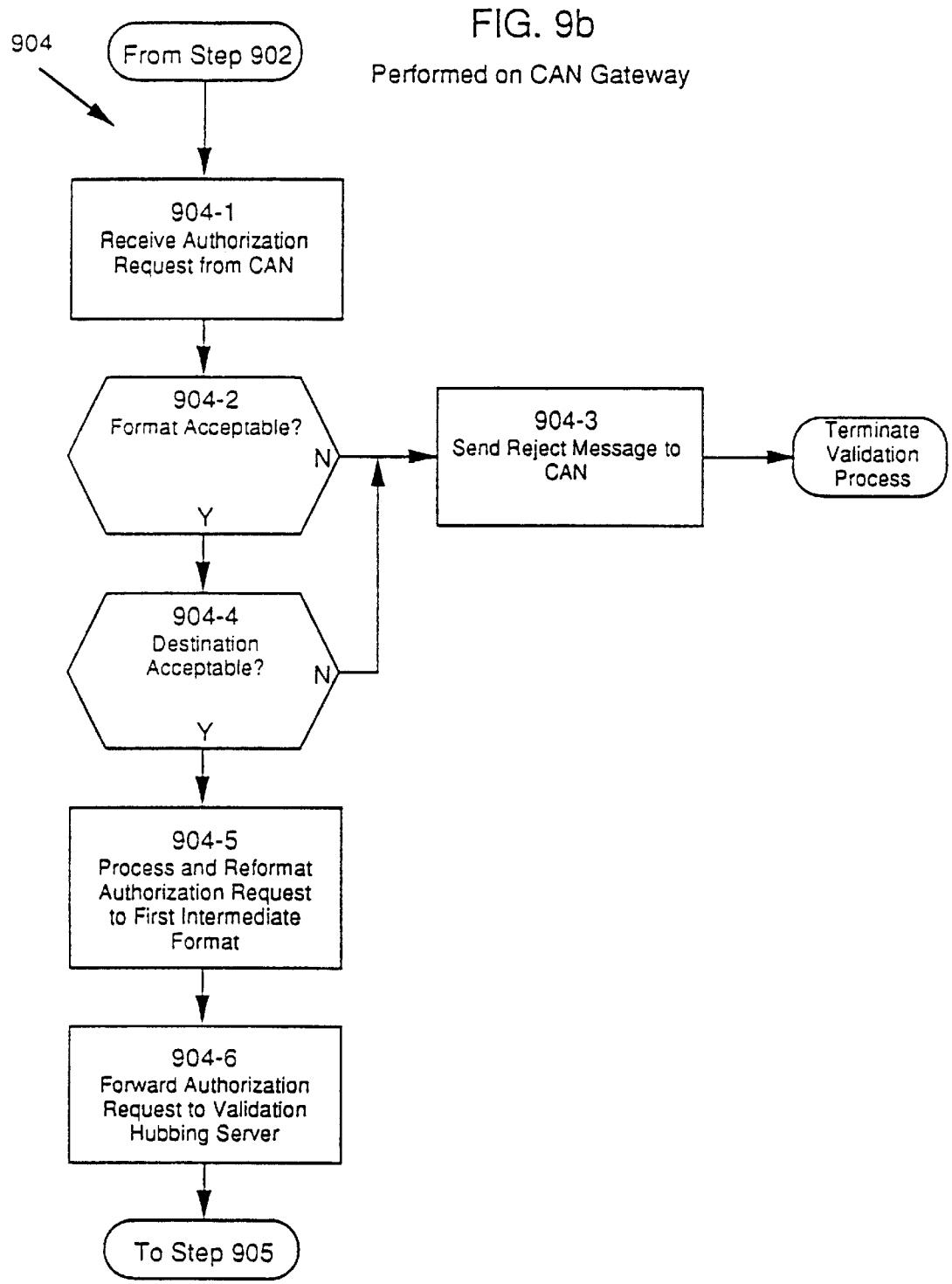

FIG. 9b is a flow diagram of the subprocess of step 904 of FIG. 9a. Step 904 is entered from step 902. In step 904-1, the gateway connected to the CAN receives an authorization request from the CAN. In step 904-2, the authorization request is processed and the format screened for acceptability. If the format is not acceptable, the process goes to step 904-3, in which a reject message is sent to the CAN. The process is then terminated. If the format is acceptable, the process goes to step 904-4, in which the authorization request is screened for acceptable destination. If the destination is not acceptable, the process goes to step 904-3, in which a reject message is sent to the CAN. The process is then terminated. If the destination is acceptable, the process goes to step 904-5, in which the authorization request is processed and reformatted to the intermediate format necessary for transmission over LAN 481 to validation hubbing server 485. In step 904-6, the reformatted authorization request is sent to validation hubbing server 485. The process then continues with step 905.

Figure 9C:
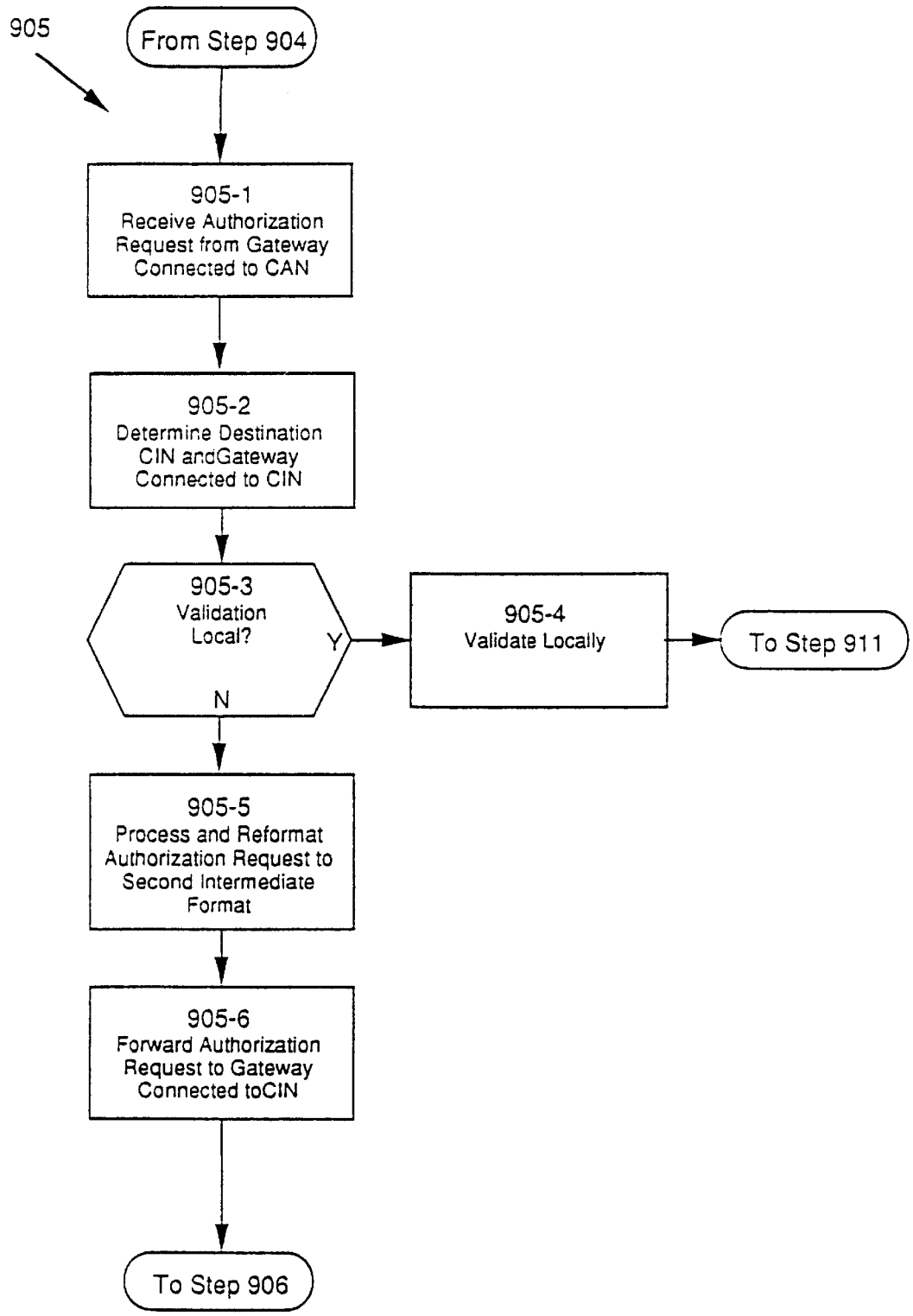

FIG. 9c is a flow diagram of the subprocess of step 905 of FIG. 9a. Step 905 is entered from step 904. In step 905-1, validation hubbing server 485 receives the authorization request from the gateway connected to the CAN. In step 905-2, validation hubbing server 485 determines the destination CIN and the gateway to which it connects. In step 905-3, validation hubbing server 485 determines whether the authorization request is destined for local validation. If so, the process goes to step 905-4, in which the authorization request is validated locally and a request response generated. The process then continues with step 911. If the authorization request is not destined for local validation, the process goes to step 905-5, in which the authorization request is processed and reformatted to the intermediate format necessary for transmission over LAN 481 to the gateway connected to the CIN. In step 905-6, the validation hubbing server forwards the authorization request to the gateway connected to the CIN. The process then continues with step 906.

Figure 9D:
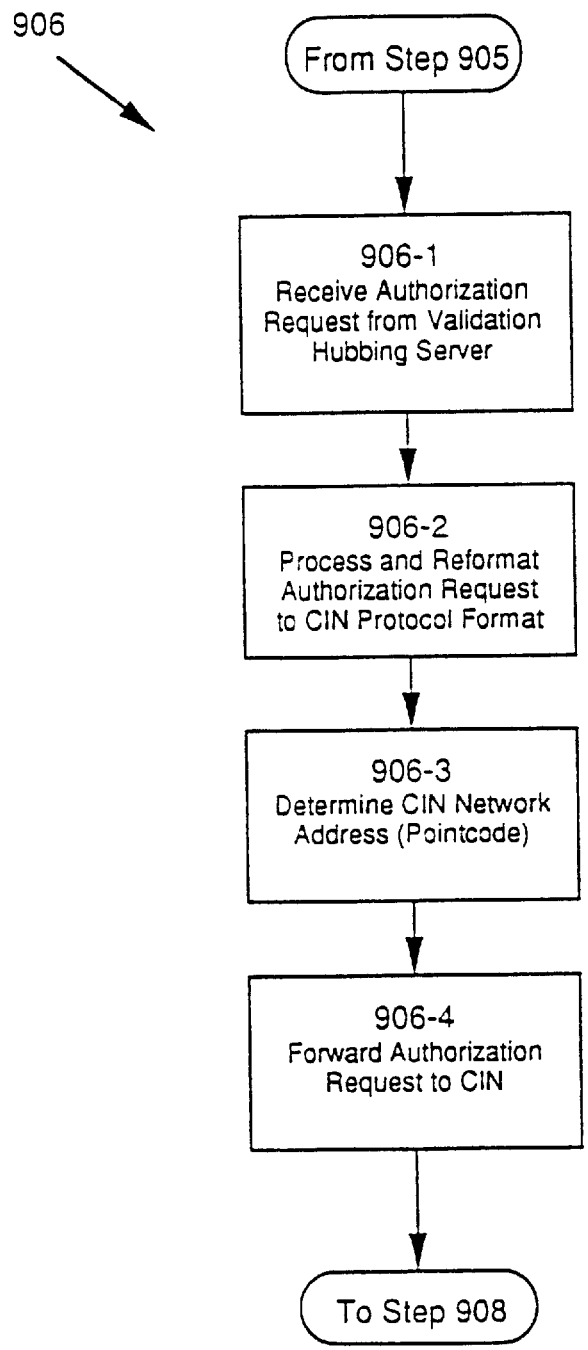

FIG. 9d is a flow diagram of the subprocess of step 906 of FIG. 9a. Step 906 is entered from step 905. In step 906-1, an authorization request from validation hubbing server 485 is received by the gateway connected to the CIN. In step 906-2, the gateway processes the request and reformats it to the CIN protocol format. In step 906-3, the gateway determines the CIN network address. In step 906-4, the gateway forwards the reformatted authorization request to the destination CIN. The process then continues with step 908.

Figure 9E:
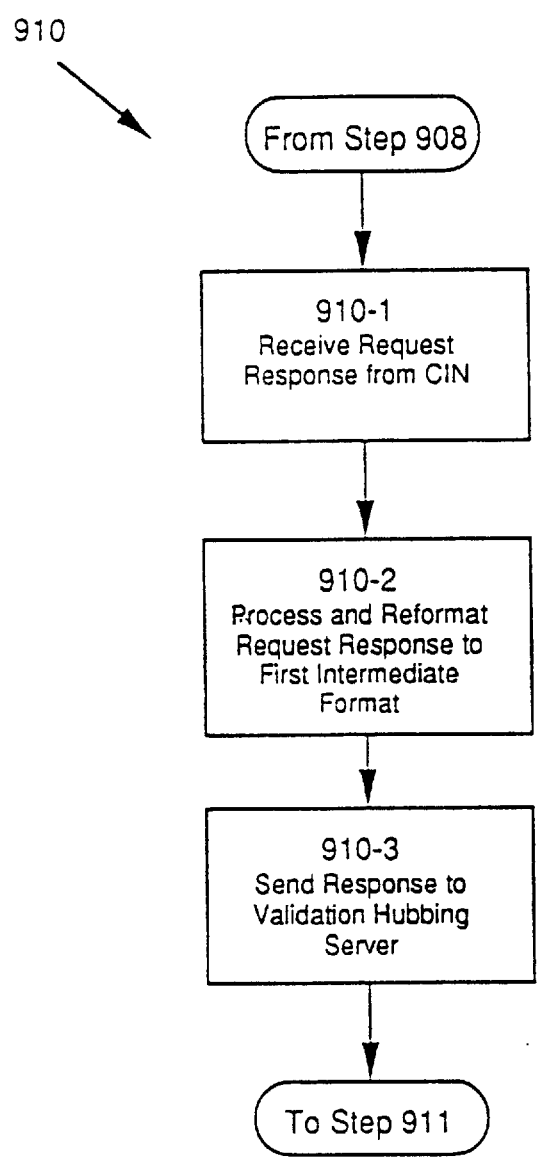

FIG. 9e is a flow diagram of the subprocess of step 910 of FIG. 9a. Step 910 is entered from step 908. In step 910-1, the gateway connected to the CIN receives a request response from the CIN. In step 910-2, the gateway processes and reformats the request response to the intermediate format necessary for transmission over LAN 481 to validation hubbing server 485. In step 910-3, the gateway forwards the request response to validation hubbing server 485. The process then goes to step 911.

Figure 9F:
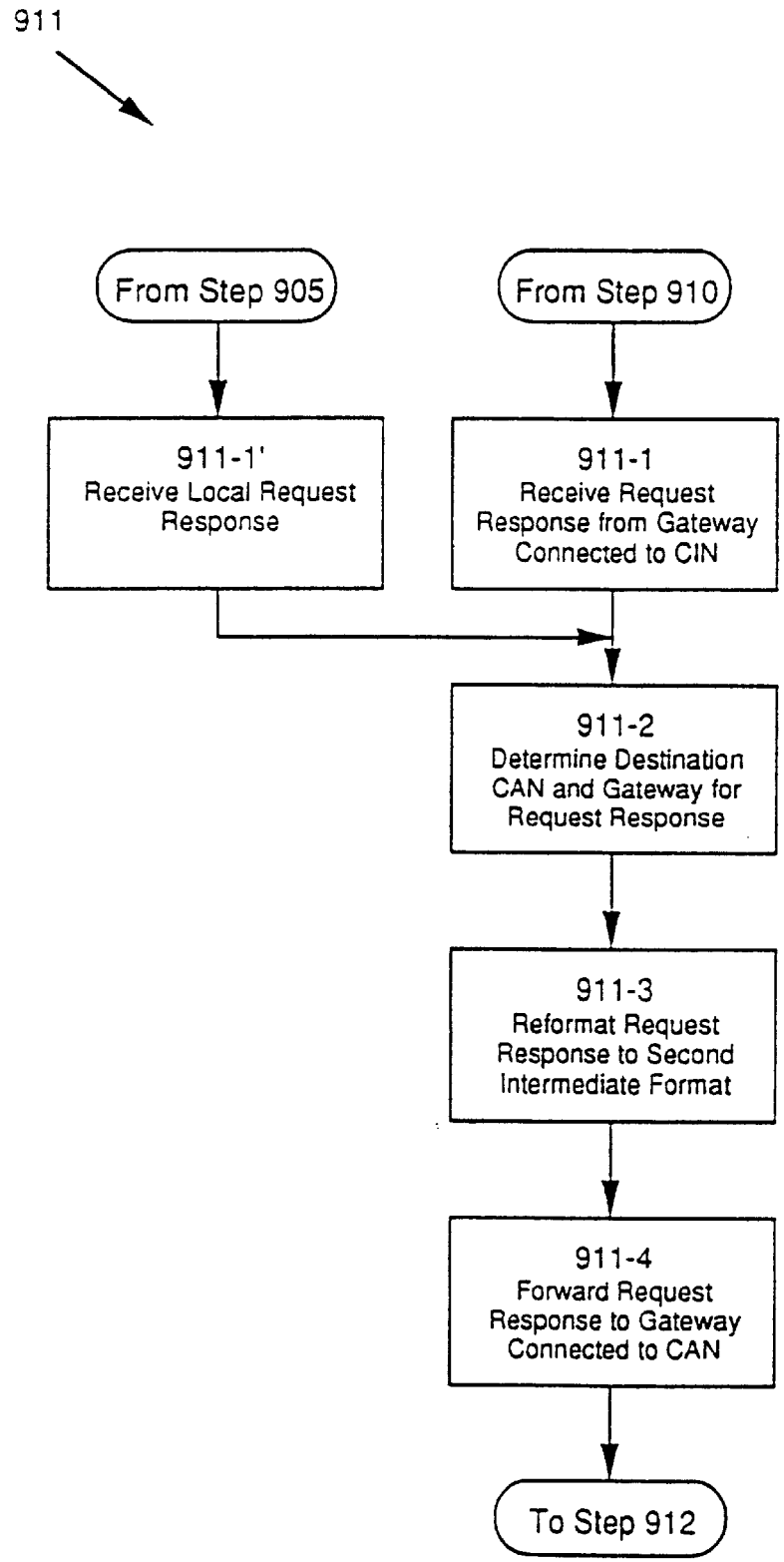

FIG. 9f is a flow diagram of the subprocess of step 911 of FIG. 9a. Step 911 is entered from either step 905 or step 910. In step 911-1, validation hubbing server 485 receives a request response from the gateway connected to the CIN. Alternatively, in step 911-1', validation hubbing server 485 receives a local request response generated in step 905-4 of FIG. 9c above. In step 911-2, validation hubbing server 485 determines the destination CAN and the gateway to which it connects. In step 911-3, validation hubbing server 485 reformats the request response to the intermediate format necessary for transmission over LAN 481 to the gateway connected to the CAN. In step 911-4, the validation hubbing server forwards the request response to the gateway connected to the CAN. The process then continues with step 912.

Figure 9G:
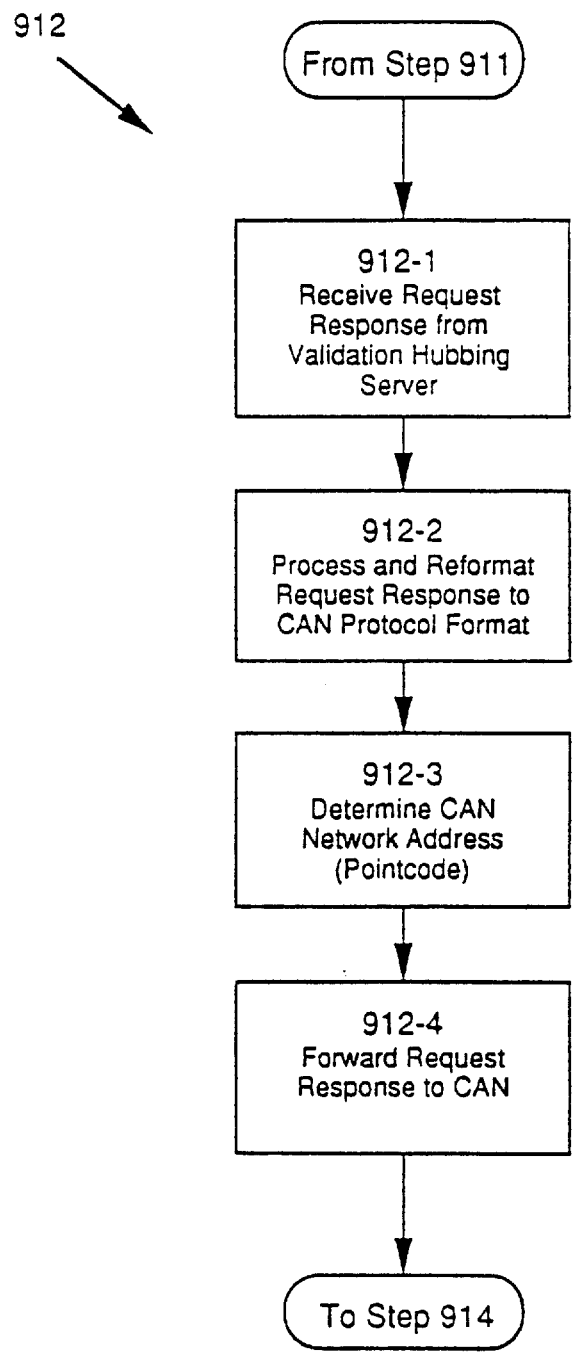

FIG. 9g is a flow diagram of the subprocess of step 912 of FIG. 9a. Step 912 is entered from step 911. In step 912-1, the gateway connected to the CAN receives the request response from validation hubbing server 485. In step 912-2, the gateway processes the request response and reformats it to the CAN protocol format. In step 912-3, the gateway determines the CAN network address. In step 912-4, the gateway forwards the request response to the CAN. The process then continues with step 914.

Steps 916, 917 and 918 of FIG. 9a are performed by the CAN, which is not part of the validation hubbing system. Because of this, these steps are not described in more detail.

Figure 9H:
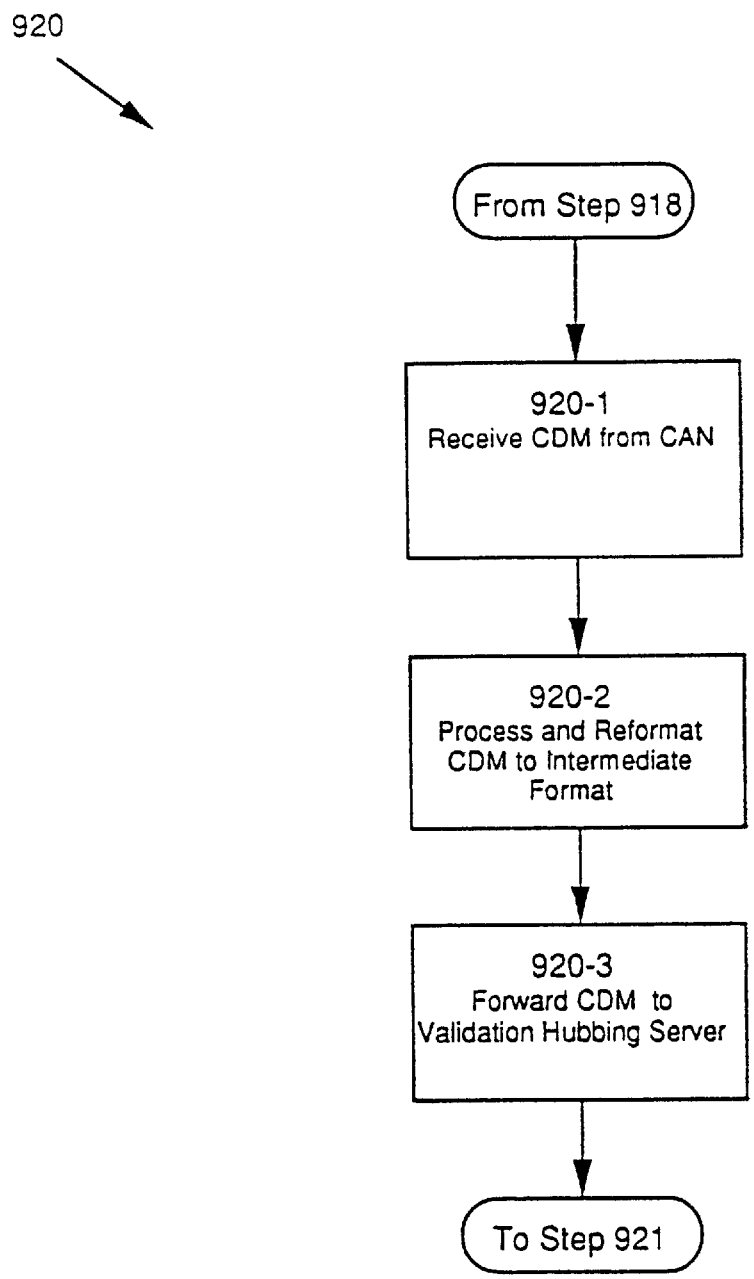

FIG. 9h is a flow diagram of the subprocess of step 920 of FIG. 9a. Step 920 is entered from step 918. In step 920-1, the gateway connected to the CAN receives a CDM from the CAN. In step 920-2, the gateway processes and reformats the CDM to the intermediate format necessary for transmission over LAN 481 to validation hubbing server 485. In step 920-3, the gateway forwards the CDM to validation hubbing server 485. The process then goes to step 921.

Figure 9I:
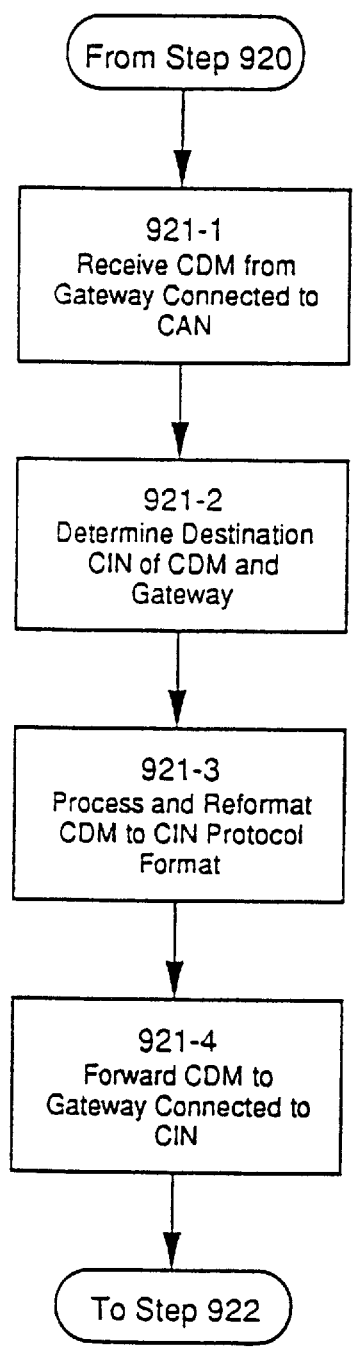

FIG. 9i is a flow diagram of the subprocess of step 921 of FIG. 9a. Step 921 is entered from step 920. In step 921-1, validation hubbing server 485 receives a CDM from the gateway connected to the CAN. In step 921-2, validation hubbing server 485 determines the destination CIN and the gateway to which it connects. In step 921-3, validation hubbing server 485 reformats the CDM to the intermediate format necessary for transmission over LAN 481 to the gateway connected to the CIN. In step 921-4, the validation hubbing server forwards the request response to the gateway connected to the CIN. The process then continues with step 922.

Figure 9J:
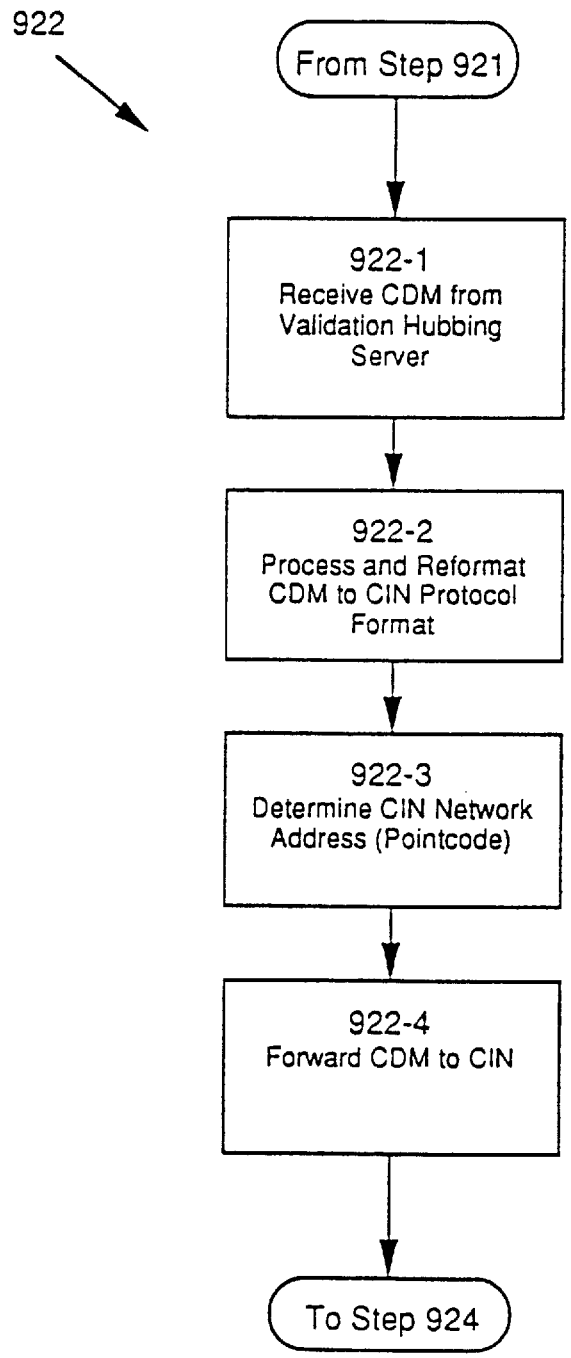

FIG. 9j is a flow diagram of the subprocess of step 922 of FIG. 9a. Step 922 is entered from step 921. In step 922-1, the gateway connected to the CIN receives the CDM from validation hubbing server 485. In step 922-2, the gateway processes the CDM and reformats it to the CIN protocol format. In step 922-3, the gateway determines the CIN network address. In step 922-4, the gateway forwards the CDM to the CIN. The process then continues with step 924.

Figure 10:
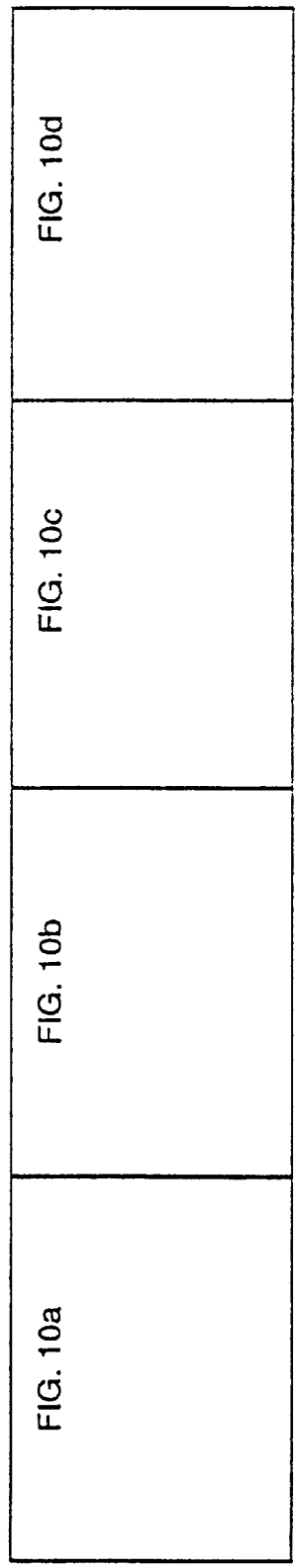
FIG. 10 is an assembly diagram comprising FIGS. 10a, 10b, 10c and 10d which are flow diagrams of process 900 of FIG. 9a for an embodiment of the invention which is capable of handling ANSI SS7, ITU CCS7 AND X.25 protocols.

FIG. 10 is an assembly diagram comprising FIGS. 10a, 10b, 10c and 10d which are flow diagrams of process 900 for an embodiment of the invention which is capable of handling ANSI SS7, ITU CCS7 and X.25 protocols. It is best viewed in conjunction with FIG. 4.

Figure 10A:
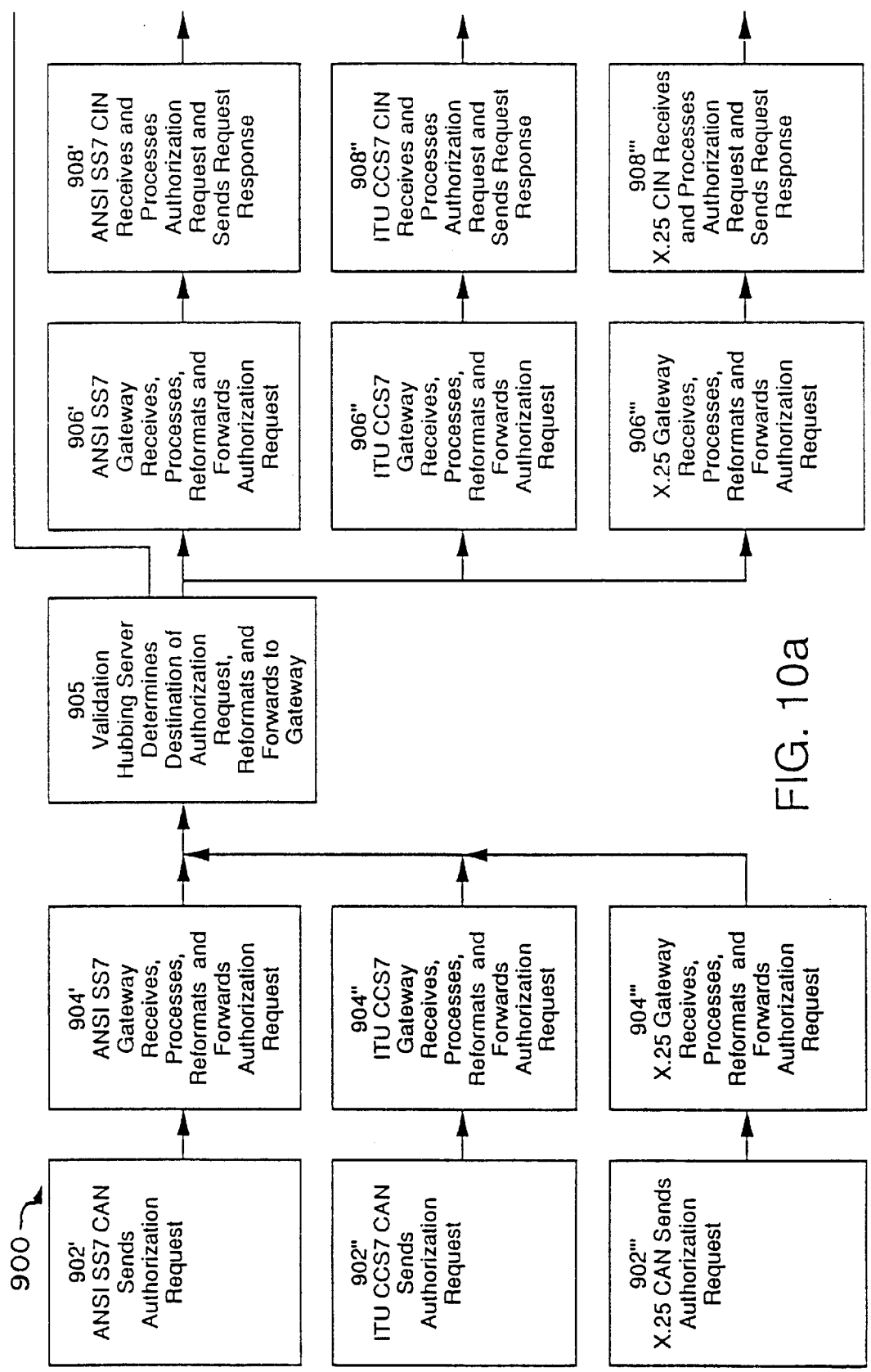

FIG. 10a shows steps 902 to 908 of FIG. 9a in three alternative processes according to the network protocol. In step 902', an ANSI SS7 CAN sends an authorization request to ANSI SS7 Gateway 482. In step 904', ANSI SS7 Gateway 482 receives the authorization request from the CAN, then processes, reformats and forwards the authorization request to validation hubbing server 485. Alternatively, in step 902'', an ITU CCS7 CAN sends an authorization request to ITU CCS7 Gateway 483. In step 904'', ITU CCS7 Gateway 483 receives the authorization request from the CAN, then processes, reformats and forwards the authorization request to validation hubbing server 485. Alternatively, in step 902''', an X.25 CAN sends an authorization request to X.25 Gateway 484. In step 904''', X.25 Gateway 484 receives the authorization request from the CAN, then processes, reformats and forwards the authorization request to validation hubbing server 485.

In step 905, validation hubbing server 485 receives the authorization request and determines its destination. If the destination is local, validation hubbing server 485 validates the authorization request locally and generates a request response. The process then continues with step 911. If the destination is a remote CIN, validation hubbing server 485 processes, reformats and forwards the authorization request to the appropriate gateway depending on the destination CIN of the request.

In step 906', ANSI SS7 482 Gateway receives the authorization request from validation hubbing server 485, then processes, reformats and forwards the authorization request to the destination ANSI SS7 CIN. In step 908', the ANSI SS7 CIN receives the authorization request, processes it and sends a request response to ANSI SS7 Gateway 482. The request response includes an indication of the success or failure of validation and may include a request for a CDM. Alternatively, in step 906'', ITU CCS7 483 Gateway receives the authorization request from validation hubbing server 485, then processes, reformats and forwards the authorization request to the destination ITU CCS7 CIN. In step 908", the ITU CCS7 CIN receives the authorization request, processes it and sends a request response to ITU CCS7 Gateway 483. The request response includes an indication of the success or failure of validation and may include a request for a CDM. Alternatively, in step 906''', X.25 484 Gateway receives the authorization request from validation hubbing server 485, then processes, reformats and forwards the authorization request to the destination X.25 CIN. In step 908''', the X.25 CIN receives the authorization request, processes it and sends a request response to X.25 Gateway 484. The request response includes an indication of the success or failure of validation and may include a request for a CDM.

Figure 10B:
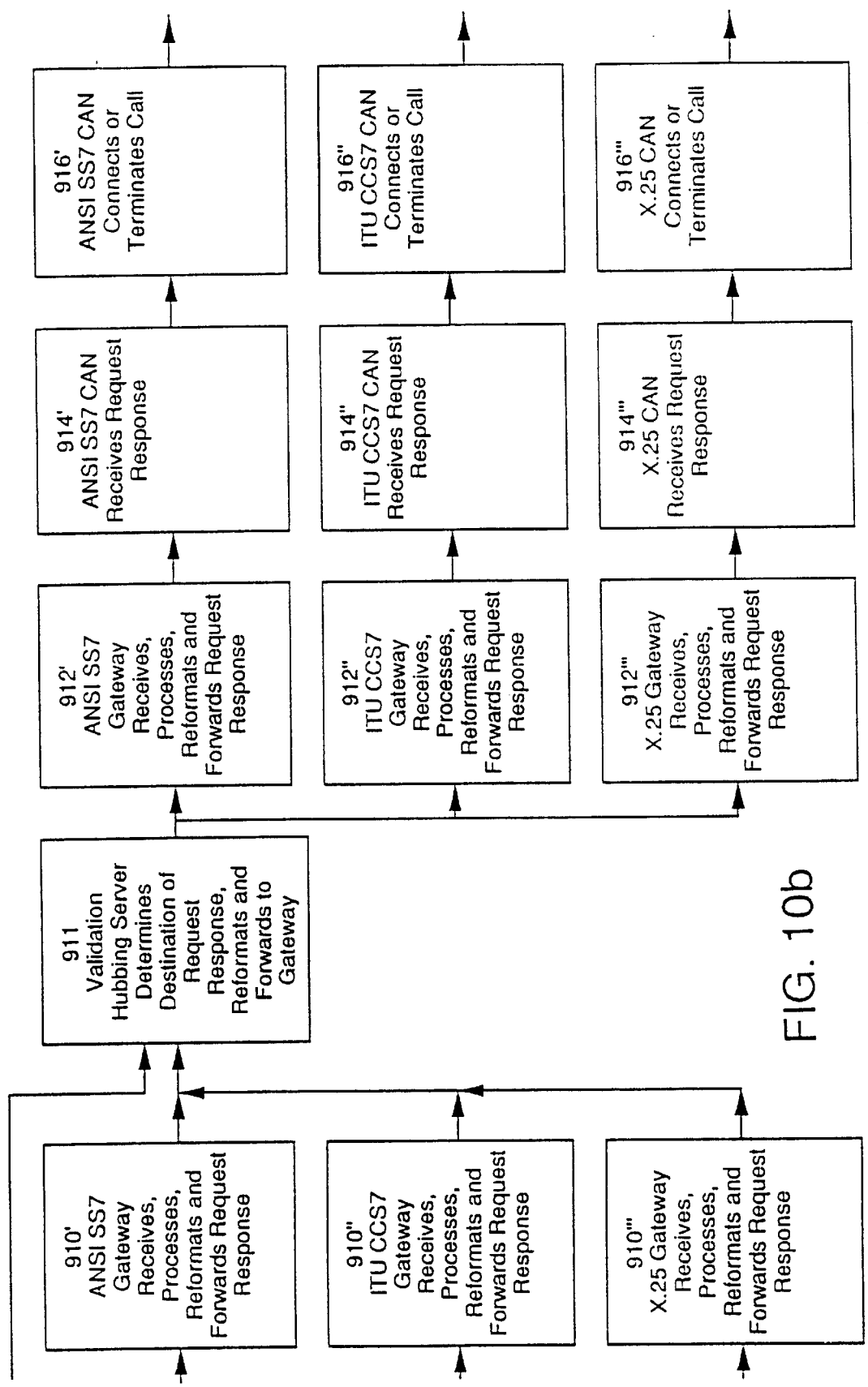

FIG. 10b shows steps 910 to 916 of FIG. 9a in three alternative processes according to the network protocol. In step 910', ANSI SS7 Gateway 482 receives the request response from the ANSI SS7 CIN, then processes, reformats and forwards the request response to validation hubbing server 485. Alternatively, in step 910", ITU CCS7 Gateway 483 receives the request response from the ITU CCS7 CIN, then processes, reformats and forwards the request response to validation hubbing server 485. Alternatively, in step 910''', X.25 Gateway 484 receives the request response from the X.25 CIN, then processes, reformats and forwards the request response to validation hubbing server 485.

In step 911, validation hubbing server 485 receives the request response from the gateway connected to the CIN or alternatively from the local validation process, determines its destination, processes, reformats and forwards it to the gateway connected to the CAN.

In step 912', ANSI SS7 Gateway 482 receives the request response from validation hubbing server 485, then processes, reformats and forwards the request response to the ANSI SS7 CAN. Alternatively, in step 912", ITU CCS7 Gateway 483 receives the request response from validation hubbing server 485, then processes, reformats and forwards the request response to the ITU CCS7 CAN. Alternatively, in step 912''', X.25 Gateway 484 receives the request response from validation hubbing server 485, then processes, reformats and forwards the request response to the X.25 CAN.

In step 914' the ANSI SS7 CAN receives the request response. In step 916', the ANSI SS7 CAN connects the call if the request response indicates validation was successful and terminates the call if the request response indicates validation was not successful. Alternatively, in step 914", the ITU CCS7 CAN receives the request response. In step 916", the ITU CCS7 CAN connects the call if the request response indicates validation was successful and terminates the call if the request response indicates validation was not successful. Alternatively, in step 914''', the X.25 CAN receives the request response. In step 916''', the X.25 CAN connects the call if the request response indicates validation was successful and terminates the call if the request response indicates validation was not successful.

Figure 10C:
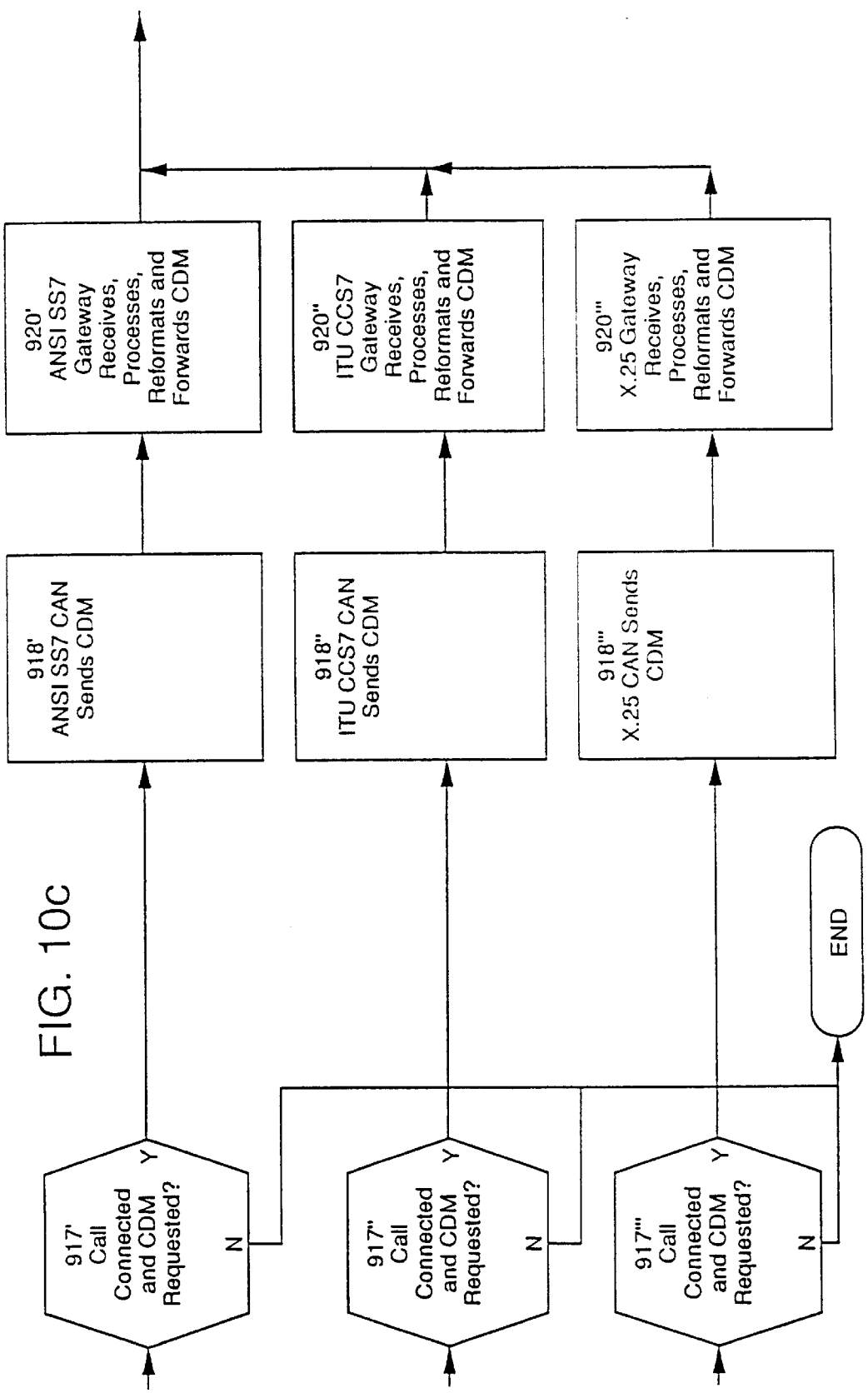

FIG. 10c shows steps 917 to 920 of FIG. 9a in three alternative processes according to the network protocol. In step 917', the ANSI SS7 CAN determines whether the call was completed or a call attempt made and whether the request response included a request for a CDM. If either the call was not completed or no call attempt was made or if the request response did not include a request for a CDM, the process ends. If either the call was completed or a call attempt was made and if the request response included a request for a CDM, the process continues with step 918', in which the ANSI SS7 CAN sends a CDM. Alternatively, In step 917", the ITU CCS7 CAN determines whether the call was completed or a call attempt made and whether the request response included a request for a CDM. If either the call was not completed or no call attempt was made or if the request response did not include a request for a CDM, the process ends. If either the call was completed or a call attempt was made and if the request response included a request for a CDM, the process continues with step 918", in which the ITU CCS7 CAN sends a CDM. Alternatively, In step 917''', the X.25 CAN determines whether the call was completed or a call attempt made and whether the request response included a request for a CDM. If either the call was not completed or no call attempt was made or if the request response did not include a request for a CDM, the process ends. If either the call was completed or a call attempt was made and if the request response included a request for a CDM, the process continues with step 918''', in which the X.25 CAN sends a CDM.

In step 920', ANSI SS7 Gateway 482 receives the CDM from the ANSI SS7 CAN, then processes, reformats and forwards the CDM to validation hubbing server 485. Alternatively, in step 920", ITU CCS7 Gateway 483 receives the CDM from the ITU CCS7 CAN, then processes, reformats and forwards the CDM to validation hubbing server 485. Alternatively, in step 920''', X.25 Gateway 484 receives the CDM from the X.25 CAN, then processes, reformats and forwards the CDM to validation hubbing server 485.

Figure 10D:
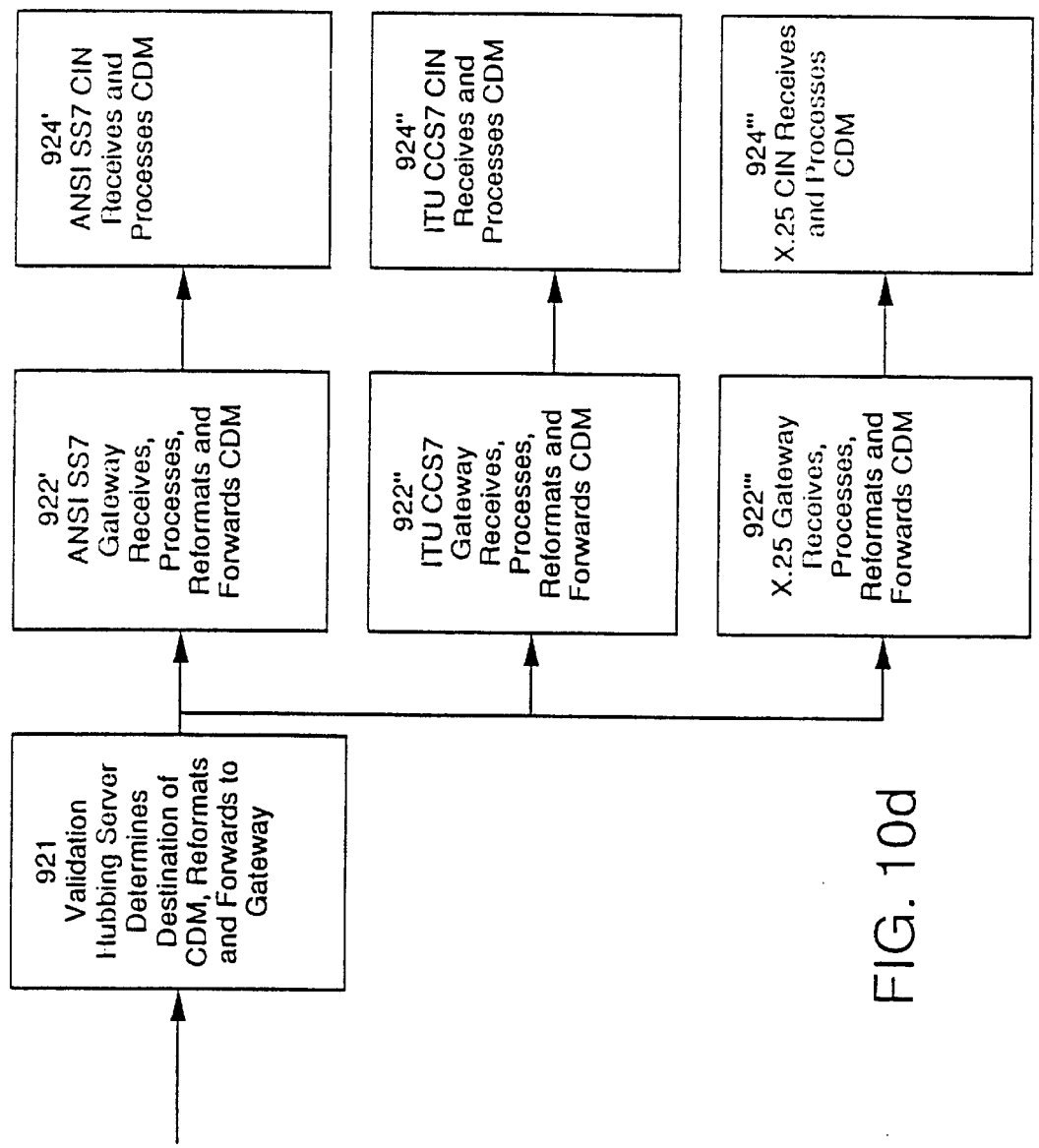

FIG. 10d shows steps 921 to 924 of FIG. 9a in three alternative processes according to the network protocol. In step 921, validation hubbing server 485 receives the CDM from the gateway connected to the CAN, determines its destination, processes, reformats and forwards it to the gateway connected to the CIN.

In step 922', ANSI SS7 Gateway 482 receives the CDM from validation hubbing server 485, then processes, reformats and forwards the CDM to the ANSI SS7 CIN. In step 924', the ANSI SS7 CIN receives and processes the CDM. Alternatively, in step 922", ITU CCS7 Gateway 483 receives the CDM from validation hubbing server 485, then processes, reformats and forwards the CDM to the ITU CCS7 CIN. In step 924", the ITU CCS7 CIN receives and processes the CDM. Alternatively, in step 922''', X.25 Gateway 484 receives the CDM from validation hubbing server 485, then processes, reformats and forwards the CDM to the X.25 CIN. In step 924''', the X.25 CIN receives and processes the CDM.

The ITCC validation process uses three types of validation messages defined in CCITT Recommendation E.113. FIG. 11a is the format of an authorization request 1100 which is a message from the CAN to the CIN which provides details of an attempt to use a card. This message allows the CIN to perform its own internal validation process on the card number. Authorization request 1100 includes message type identifier 1101, message reference identifier 1102, primary account number 1103 and card acceptor identifier 1104. Authorization request 1100 may also include additional information 1105 as defined in CCITT Recommendation E.113. Message type identifier 1101 identifies the message as an authorization request. Message reference identifier 1102 uniquely relates the message to a specific validation transaction. Primary account number 1103 identifies the card being used and allows routing of the authorization request to the appropriate network. Card acceptor identifier 1104 identifies the CAN which sent the authorization request. It is used for origination point screening and billing.

FIG. 11b is the format of a request response 1120 which is a message from the CIN to the CAN. The request response provides a positive or negative response to the authorization request and also indicates whether the CIN requests a CDM. Request response 1120 includes message type identifier 1121, message reference identifier 1122, primary account number 1123, response code 1124 and CDM request indicator 1125. Request response 1120 may also include additional information 1126 as defined in CCITT Recommendation E.113. Message type identifier 1121 identifies the message as a request response. Message reference identifier 1122 uniquely relates the message to a specific validation transaction. Primary account number 1123 provides closure between the authorization request and the request response. Response code 1124 indicates the result of the authorization request. If the response is negative, the request response includes a specific indication as to the reason the authorization request should not be granted. Such a reason may include, for example, PIN incorrect, service discontinued or card lost or stolen. CDM request indicator 1125 indicates whether the CIN requests a CDM from the CAN.

Figure 11C:
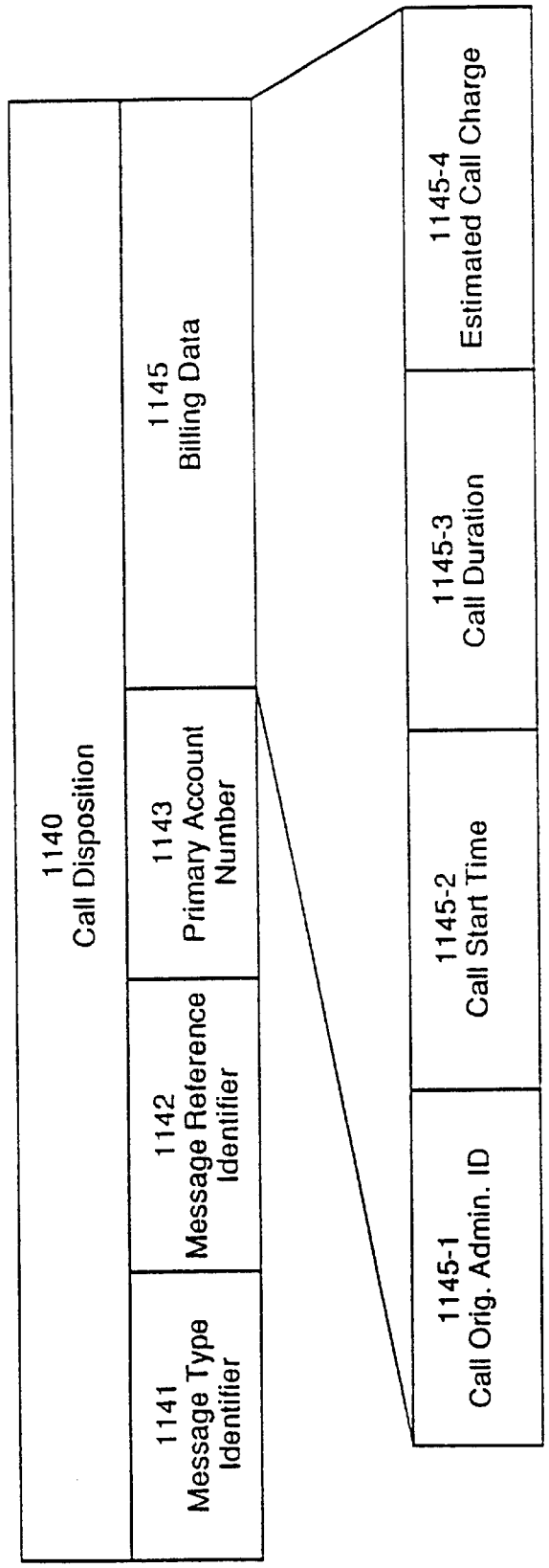
FIG. 11c is a format of a call disposition message 1140.

FIG. 11c is the format of a call disposition message (CDM) 1140 which is an optional message which contains information to allow a more complete estimate of call activity. If used, the CDM should be sent from the CAN to the CIN in a timely manner after completion of a call or call attempt. A CDM does not replace actual billing information, which is typically not sent in a timely manner. Rather, the CDN provides a timely estimate of call duration and charges. CDM 1140 includes message type identifier 1141, message reference identifier 1142, primary account number 1143 and billing data 1145. Message type identifier 1141 identifies the message as a call disposition. Message reference identifier 1142 uniquely relates the message to a specific validation transaction. Primary account number 1143 provides closure between the authorization request and the CDM.

Billing data 1145 includes several components. Call originating administration identifier 1145-1 identifies the telecommunications service provider which originated the call. Call start time 1145-2 indicates the time the call started. Call duration 1145-3 indicates the time duration of the call. Estimated call charge 1145-4 is an optional field which indicates the estimated charge for the call in standard drawing rights (SDR). SDRs are a fictitious currency based upon the U.S. dollar, the Japanese Yen, the British pound and the German mark. The rate is published on a daily basis by the International Monetary Fund. It is used in international transactions to account for and protect against currency fluctuations.

FIG. 11d is the format of a primary account number (PAN) 1160. PAN 1160 is a number of 19 digits maximum as defined in CCITT Recommendation E.118. PAN 1160 includes issuer identification number 1161, which is a number of seven digits maximum which uniquely identifies each card issuing organization. Issuer identification number 1161 is used to route messages to the CIN of each transaction. Issuer identification number 1161 includes major industry identifier (MII) 1162, country code 1163 and issuer identifier number 1164. MII 1162 is a two digit number which identifies the industry group to which the card issuer belongs. For example, the number '89' is assigned for telecommunications purposes to administrations. Country code 1163 is a number of one to three digits which identifies the country in which the card issuer is located. Issuer identifier number 1164 is a number of from two to four digits which identifies a particular card issuer within an industry group and country.

PAN 1160 includes individual account number 1165, a number of from eleven to fourteen digits which identifies the individual user account. PAN 1160 also includes check digit 1166 which provides an integrity check for PAN 1160.

Although specific embodiments have been disclosed, it will be seen by those of skill in the art that there are other embodiments possible which are equivalent to those disclosed.

What is claimed is:

1. In a telecommunications network using different network protocols and including a gateway for each protocol, a validation server, an operational maintenance server and a processor, a method for automated charge card validation between a card issuer network and a card acceptor network at a central validation hub system, comprising the steps of:

a) receiving an authorization request having a card acceptor network protocol from said card acceptor network at said validation hub system, said authorization request including a calling card number to be validated;

b) translating said card acceptor network protocol authorization request to a card issuer network protocol authorization request in said validation hub system;

c) forwarding said protocol translated authorization request from said validation hub system to said card issuer network;

d) receiving a card issuer network protocol request response from said card issuer network at said validation hub system;

e) translating said card issuer network protocol request response to a card acceptor network protocol request response in said validation hub system; and f) forwarding said card acceptor network protocol request response from said validation hub system to said card acceptor network.

2. The method of claim 1, further comprising the steps of:

g) receiving a card acceptor network protocol call disposition message from said card acceptor network at said validation hub system;

h) translating said card acceptor network protocol call disposition message to a call issuer network protocol disposition message in said validation hub system; and i) forwarding said translated call issuer network protocol call disposition message from said validation hub system to said card issuer network.

3. In a telecommunications network using different network protocols and including a gateway for each protocol, a validation server, an operational maintenance server and a processor, a method for automated charge card validation between a card issuer network and a card acceptor network at a central validation hubbing system, comprising the steps of:

a) communicating an authorization request with card acceptor network protocol from said card acceptor network to said validation hubbing system;

b) communicating said authorization request from said validation hubbing system to a card issuer network after said card acceptor network protocol authorization request has been translated to a card issuer network protocol authorization request;

c) communicating a request response with card issuer network protocol from said card issuer network to said validation hubbing system; and d) communicating from said validation hubbing system to said card acceptor network a card acceptor network protocol request response after said card issuer network protocol request response is converted to said card acceptor network protocol request response.

4. The method of claim 3, further comprising the steps of:
communicating a call disposition message with a card acceptor network protocol from said card acceptor network to said validation hubbing system if said card issuer network requests a call disposition message; and
communicating said call disposition message from said validation hubbing system to said card issuer network.

5. The method of claim 4, wherein said validation hubbing system includes a first gateway and a second gateway; and wherein the method further comprises the steps of:
receiving said authorization request at said first gateway;
translating the protocol of said authorization request in said first gateway;
forwarding said translated protocol authorization request from said first gateway to said validation hubbing server;
determining a telecommunications network and gateway destined by said authorization request in said validation hubbing server;
forwarding said translated protocol authorization request from said validation hubbing server to said second gateway;
retranslating the protocol of said authorization request at said second gateway; and
forwarding said retranslated protocol authorization request from said second gateway to said card issuer network.

6. The method of claim 5, further comprising the steps of:
receiving said request response from said card issuer network at said second gateway;
translating the protocol of said request response at said second gateway;
forwarding said translated protocol request response from said second gateway to said first gateway;
retranslating the protocol of said request response at said first gateway; and
forwarding the retranslated protocol request response from said first gateway to said card acceptor network.

7. The method of claim 4, further comprising the steps of:
receiving a call disposition message from said card acceptor network at a first gateway;
translating the protocol of said call disposition message at said first gateway;
forwarding said translated protocol call disposition message from said first gateway to said second gateway;
retranslating the protocol of said request response at said second gateway; and
forwarding said retranslated protocol request response from said second gateway to said card issuer network.

8. A validation hubbing system for automated charge card validation between a card acceptor network and a card issuer network, comprising:
a first receiver, coupled to said card acceptor network, for receiving an authorization request with a card acceptor network protocol, said authorization request having a calling card number to be validated;
a first translator, coupled to said receiver, for translating said card acceptor network protocol authorization request into an authorization request with card issuer network protocol;
a first transmitter, coupled to said first translator and said card issuer network, for transmitting said protocol translated authorization request to said card issuer network;

a second receiver, coupled to said card issuer network, for receiving a request response with card issuer network protocol having an indication of whether said protocol translated authorization request has been approved or rejected and whether said card issuer network requests a call disposition message;
a second translator, coupled to said second receiver, for translating a request response with card issuer network protocol; and
a second transmitter, coupled to said second translator and said card acceptor network, for transmitting said protocol translated request response to said card acceptor network.

9. The system of claim 8, further comprising:
a third receiver, coupled to said card acceptor network, for receiving a call disposition message with card acceptor network protocol;
a third translator, coupled to said third receiver, for translating said card acceptor network protocol call disposition message to a call disposition message with card issuer network protocol; and
a third transmitter, coupled to said third translator and said card issuer network, for transmitting said card issuer network protocol call disposition message to said card issuer network.

10. A validation hubbing system for automated charge card validation between a card acceptor network and a card issuer network, comprising:
a first gateway, coupled to said card acceptor network, adaptable for communicating a validation message;
a second gateway, coupled to said first gateway and said card issuer network, adaptable for communicating said validation message; and
a validation hubbing server coupled to said first and second gateways for providing a common hub whereby said validation message can be communicated between said first and second gateways.

11. The system of claim 10, wherein said validation messages comprise authorization requests; and
wherein said first gateway comprises:
a first receiver, coupled to said card acceptor network, for receiving an authorization request with card acceptor network protocol from said card acceptor network;
a first translator, coupled to said first receiver, for translating said card acceptor protocol authorization request to an authorization request with an intermediate protocol; and
a first transmitter, coupled to said first translator and said validation hubbing server, for transmitting said retranslated authorization request to said validation hubbing server.

12. The system of claim 11, wherein said second gateway comprises:
a second receiver, coupled to said validation hubbing server, for receiving said authorization request with the intermediate protocol from said validation hubbing server;
a second translator, coupled to said second receiver, for generating an authorization request with the protocol of said card issuer network; and
a second transmitter, coupled to said second translator and said card issuer network, for transmitting said authorization request with the card issuer protocol to said card issuer network.

13. The system of claim 10, wherein said validation messages comprise request responses; and
wherein said first gateway comprises:
a first receiver, coupled to said card issuer network, for receiving a request response with card issuer network protocol from said card issuer network;
a first translator, coupled to aid first receiver, for generating a request response with an intermediate protocol; and
a first transmitter, coupled to said first translator and said validation hubbing server, for transmitting said translated request response to said validation hubbing server.

14. The system of claim 13, wherein said second gateway comprises:
a second receiver, coupled to said validation hubbing server, for receiving a request response with the intermediate protocol;
a second translator, coupled to said second receiver, for generating a request response with the protocol of said card acceptor network; and
a second transmitter, coupled to said second translator and said card acceptor network, for transmitting said request response with the card acceptor network protocol to said card acceptor network.

15. The system of claim 10, wherein said validation message comprises a call disposition message; and
wherein said first gateway comprises:
a first receiver, coupled to said card issuer network, for receiving said call disposition message;
a first translator, coupled to said first receiver, for generating a call disposition message with an intermediate protocol; and
a first transmitter, coupled to said first translator and said validation hubbing server, for transmitting said call disposition message with the intermediate protocol to said validation hubbing server.

16. The system of claim 5, wherein said second gateway further comprises:
a second receiver, coupled to said validation hubbing server, for receiving a call disposition message;
a second translator, coupled to said second receiver, for generating a call disposition message with the protocol of said card acceptor network; and
a second transmitter, coupled to said second translator and said card acceptor network, for transmitting said call disposition message with the card acceptor network protocol to said card acceptor network.

17. The system of claim 10, wherein said validation message comprises an authorization request; and
wherein said validation hubbing server comprises:
a receiver, coupled to each gateway, for receiving an authorization request with a first intermediate protocol;
a router, coupled to said receiver, for determining the destination gateway for said received authorization request;
a translator, coupled to said receiver, for translating said received authorization request to an authorization request having a second intermediate protocol; and
a transmitter, coupled to said router, said translator and each gateway, for transmitting said authorization request with the second intermediate protocol to said destination gateway.

18. The system of claim 10, wherein said validation message comprises a request response; and
wherein said validation hubbing server comprises:
a receiver, coupled to each gateway, for receiving a request response with a first intermediate protocol;
a router, coupled to said receiver, for determining the destination gateway for said received request response;
a translator coupled to said receiver, for translating said received request response to a received request with second intermediate protocol; and
a transmitter, coupled to said router, said translator and each gateway, for transmitting said request response with the second intermediate protocol to said destination gateway.

19. The system of claim 10, wherein said validation message comprises a call disposition message;
wherein said validation hubbing server comprises:
a receiver, coupled to each gateway, for receiving said call disposition message with first intermediate protocol from said first gateway;
a router, coupled to said receiver, for determining the destination gateway for said received call disposition message;
a translator, coupled to said receiver, for translating said received call disposition message to a call disposition message with a second intermediate protocol; and
a transmitter, coupled to said router, said translator and said each gateway, for transmitting said call disposition message with the second intermediate protocol to said destination gateway.

20. A validation hubbing system for automated charge card validation between a card acceptor network and a card issuer network, comprising:
an ANSI SS7 gateway adaptable for communicating validation messages coupled to at least one telecommunications network;
an ITU CCS7 gateway adaptable for communicating validation messages coupled to said ANSI SS7 gateway and to at least one other telecommunications network;
an X.25 gateway adaptable for communicating validation messages coupled to said ANSI SS7 gateway, said ITU CCS7 gateway and at least yet another telecommunications network; and
a validation hubbing server coupled to all said gateways to thereby provide a common hub for all said gateways so that validation messages from any one of said telecommunications networks can be communicated to any other ones of said telecommunications networks.

21. The system of claim 20, wherein said ANSI SS7 gateway comprises:
a first receiver, coupled to said at least one telecommunications network, for receiving a validation message in ANSI SS7 protocol from said at least one telecommunications network;
a first translator, coupled to said receiver, for translating said ANSI SS7 protocol validation message a validation message with a first intermediate protocol;
a first transmitter, coupled to said first translator, for transmitting said validation message with the first intermediate protocol to a validation hubbing server;
a second receiver, coupled to said validation hubbing server, for receiving a validation message with a second intermediate protocol;
a second translator, coupled to the receiver, for translating said validation message with the second intermediate protocol to a validation message with ANSI SS7 protocol; and a second transmitter, coupled to said second translator and to said at least one telecommunications network, for transmitting, said validation message with ANSI SS7 protocol to said at least one telecommunications network.

22. The system of claim 20, wherein said ITU CCS7 gateway comprises:

a first receiver, coupled to said at least one other telecommunications network, for receiving a validation message with ITU CCS7 protocol from said telecommunications network;

a first translator, coupled to said receiver, for translating said validation message with ITU CCS7 protocol into a validation message with a first intermediate protocol;

a first transmitter, coupled to the first translator, for transmitting said first intermediate protocol validation message to a validation hubbing server;

a second receiver, coupled to said validation hubbing server, for receiving said second intermediate protocol validation message;

a second translator, coupled to said receiver, for translating said second intermediate protocol validation message to a validation message with ITU CCS7 protocol; and a second transmitter, coupled to said second translator and at least one telecommunications network, for transmitting the ITU CCS7 validation message to said at least said one telecommunications network.

23. The system of claim 20, wherein said X.25 gateway comprises:

a first receiver, coupled to said at least yet another telecommunications network, for receiving a validation message with X.25 protocol from said telecommunications network;

a first translator, coupled to said receiver, for translating said X.25 protocol validation message to a validation message with a first intermediate protocol;

a first transmitter, coupled to said first translator, for transmitting said first intermediate protocol validation message to a validation hubbing server;

a second receiver, coupled to said validation hubbing server, for receiving said second intermediate protocol validation message; a second translator, coupled to said receiver, for translating said second intermediate protocol validation message into a validation message with X.25 protocol; and a second transmitter, coupled to said second translator and to at least one telecommunications network, for transmitting said X.25 protocol validation message to said at least one telecommunications network.

24. The system of claim 20, wherein said validation hubbing server comprises:

a receiver, coupled to each of said gateways, for receiving a validation message with a first intermediate protocol from one of said gateways;

a router, coupled to said receiver, for determining the destination gateway for said received validation message;

a translator, coupled to said receiver, for translating said received validation message to a validation message with a second intermediate protocol; and a transmitter, coupled to said the router, said translator and said each gateway, for transmitting said second intermediate protocol validation message to said destination gateway.

25. The system according to claim 20, wherein said validation messages comprise an authorization request, a request response, and a call disposition message.

\* \* \* \* \*